(12) United States Patent  (10) Patent No.: US 9,348,844 B2
Gershon et al.  (45) Date of Patent: *May 24, 2016

(54) SYSTEM AND METHOD FOR NORMALIZATION AND CODIFICATION OF COLORS FOR DYNAMIC ANALYSIS

(71) Applicant: ZENCOLOR CORPORATION, Coral Gables, FL (US)

(72) Inventors: Dann Gershon, Coral Gables, FL (US); David Robinson, Jersey City, NJ (US); Jonathan Wilder, Miami, FL (US); Maurice W. Schonfeld, New York, NY (US)

(73) Assignee: ZENCOLOR CORPORATION, Coral Gables, FL (US)

( * ) Notice: Subject to any disclaimer, the term of this patent is extended or adjusted under 35 U.S.C. 154(b) by 173 days.

This patent is subject to a terminal disclaimer.

(21) Appl. No.: 14/055,884

(22) Filed: Oct. 17, 2013

(65) Prior Publication Data

US 2015/0110390 A1  Apr. 23, 2015

Related U.S. Application Data

(63) Continuation of application No. 13/910,557, filed on Jun. 5, 2013, now Pat. No. 8,600,153, which is a continuation-in-part of application No. 13/762,160, filed on Feb. 7, 2013, and a continuation-in-part of (Continued)

(51) Int. Cl.

| G06K 9/00 | (2006.01) |
| G06K 9/46 | (2006.01) |
| G06K 9/66 | (2006.01) |
| G06T 7/00 | (2006.01) |
| G06F 17/30 | (2006.01) |

(Continued)

(52) U.S. Cl.

CPC .......... *G06F 17/3025* (2013.01); *G06K 9/6212* (2013.01); *G06Q 30/0639* (2013.01); *G06T 7/408* (2013.01); *G06T 2207/10024* (2013.01); *G06T 2207/20021* (2013.01)

(58) Field of Classification Search

None

See application file for complete search history.

(56) References Cited

U.S. PATENT DOCUMENTS 3,652,092 A  3/1972  Boyer et al.
5,668,633 A  9/1997  Cheetam et al.

(Continued)

FOREIGN PATENT DOCUMENTS

JP  2000-348050 A  12/2000
JP  2002-180318 A  6/2002

(Continued)

*Primary Examiner* — Bernard Krasnic

(74) *Attorney, Agent, or Firm* — Im IP Law PLLC; C. Andrew Im

(57) ABSTRACT

A system and method for normalizing and codifying divergent color systems into a single universal color system. The middleware engine receives a data feed comprising a plurality of color swatches or images from one or more merchant system and normalizes the data feed into a common format. The dominant processor extracts the product images from the normalized data, segments each product image into segments, determines a dominant color for each segment, and determines the dominant product color for each product image based on prevalence of the dominant product color in each segment. The matched color processor converts the determined dominant product color into a digital value of the universal color system based on the color component intensity values.

21 Claims, 12 Drawing Sheets

Related U.S. Application Data application No. 13/762,281, filed on Feb. 7, 2013, and a continuation-in-part of application No. 13/857,685, filed on Apr. 5, 2013, and a continuation-in-part of application No. PCT/US2013/025135, filed on Feb. 7, 2013, and a continuation-in-part of application No. PCT/US2013/025200, filed on Feb. 7, 2013, and a continuation-in-part of application No. PCT/US2013/035495, filed on Apr. 5, 2013, said application No. 13/857,685 is a continuation-in-part of application No. 13/762,160, and a continuation-in-part of application No. 13/762,281, said application No. PCT/US2013/035495 is a continuation-in-part of application No. 13/762,160, and a continuation-in-part of application No. 13/762,281.

(60) Provisional application No. 61/656,206, filed on Jun. 6, 2012, provisional application No. 61/679,973, filed on Aug. 6, 2012, provisional application No. 61/792,401, filed on Mar. 15, 2013, provisional application No. 61/595,887, filed on Feb. 7, 2012.

(51) Int. Cl.
*G06T 7/40* (2006.01)
*G06Q 30/06* (2012.01)
*G06K 9/62* (2006.01)

(56) References Cited

U.S. PATENT DOCUMENTS

| | | | |
|---|---|---|---|
| 6,349,300 | B1 | 2/2002 | Graf et al. |
| 6,563,510 | B1 | 5/2003 | Rice et al. |
| 6,594,386 | B1 | 7/2003 | Golshani et al. |
| 6,924,817 | B2 | 8/2005 | Rice et al. |
| 7,187,386 | B2 | 3/2007 | Rice et al. |
| 7,561,735 | B2 | 7/2009 | Levin et al. |
| 7,689,544 | B2 | 3/2010 | Koenig |
| 7,711,610 | B2 | 5/2010 | Iwaki et al. |
| 8,532,372 | B2 * | 9/2013 | Youngman et al. ........... 382/162 |
| 8,600,153 | B2 * | 12/2013 | Gershon et al. ............... 382/162 |
| 2001/0049636 | A1 * | 12/2001 | Hudda et al. ..................... 705/26 |
| 2002/0069131 | A1 | 6/2002 | Miyata et al. |
| 2002/0184171 | A1 | 12/2002 | McClanahan |
| 2003/0174143 | A1 | 9/2003 | Rice et al. |
| 2003/0231185 | A1 | 12/2003 | Kupersmit |
| 2006/0001665 | A1 | 1/2006 | Kupersmit |
| 2006/0210952 | A1 | 9/2006 | Toland |
| 2006/0250623 | A1 | 11/2006 | Newman et al. |
| 2007/0028178 | A1 | 2/2007 | Gibson et al. |
| 2008/0046410 | A1 | 2/2008 | Lieb |
| 2008/0075360 | A1 | 3/2008 | Li et al. |
| 2008/0118146 | A1 | 5/2008 | Cieplinski |
| 2008/0316513 | A1 | 12/2008 | Yamazoe |
| 2009/0112862 | A1 | 4/2009 | Mo |
| 2009/0281925 | A1 | 11/2009 | Winter et al. |
| 2010/0020095 | A1 | 1/2010 | Reynolds et al. |
| 2010/0110101 | A1 | 5/2010 | Relyea et al. |
| 2010/0254600 | A1 | 10/2010 | Kim |
| 2012/0045121 | A1 * | 2/2012 | Youngman et al. ........... 382/162 |
| 2012/0203760 | A1 | 8/2012 | Abraham et al. |
| 2013/0044944 | A1 | 2/2013 | Wang et al. |
| 2013/0083999 | A1 | 4/2013 | Bhardwaj et al. |

FOREIGN PATENT DOCUMENTS

| | | |
|---|---|---|
| JP | 2003099629 A | 4/2003 |
| JP | 2004-118444 A | 4/2004 |
| JP | 2004312444 A | 11/2004 |
| JP | 2004318445 A | 11/2004 |
| KR | 10-2002-0004736 A | 1/2002 |
| KR | 10-2002-0074528 A | 10/2002 |
| KR | 10-2003-0029616 A | 4/2003 |
| KR | 10-2008-0032890 A | 4/2008 |
| KR | 20090094526 A | 9/2009 |

* cited by examiner

SYSTEM AND METHOD FOR NORMALIZATION AND CODIFICATION OF COLORS FOR DYNAMIC ANALYSIS

RELATED APPLICATIONS

The present application is a continuation of U.S. application Ser. No. 13/910,557, which claims priority to U.S. Provisional Application Nos. 61/656,206 filed Jun. 6, 2012, 61/679,973 filed Aug. 6, 2012 and 61/792,401 filed Mar. 15, 2013, each of which is incorporated herein by reference in its entirety.

The present application is a continuation of U.S. application Ser. No. 13/910,557, which is a continuation-in-part application of U.S. application Ser. No. 13/762,160 filed Feb. 7, 2013, which claims priority to U.S. Provisional Application Nos. 61/595,887 filed on Feb. 7, 2012, 61/656,206 filed on Jun. 6, 2012, and 61/679,973 filed on Aug. 6, 2012, each of which is incorporated herein by reference in its entirety.

The present application is a continuation of U.S. application Ser. No. 13/910,557, which is a continuation-in-part application of PCT Application No. PCT/US13/25135 filed Feb. 7, 2013, which claims priority to U.S. Provisional Application Nos. 61/595,887 filed on Feb. 7, 2012, 61/656,206 filed on Jun. 6, 2012, and 61/679,973 filed on Aug. 6, 2012, each of which is incorporated herein by reference in its entirety.

The present application is a continuation of U.S. application Ser. No. 13/910,557, which is a continuation-in-part application of U.S. application Ser. No. 13/762,281 filed Feb. 7, 2013, which claims priority to U.S. Provisional Application Nos. 61/595,887 filed on Feb. 7, 2012, 61/656,206 filed on Jun. 6, 2012, and 61/679,973 filed on Aug. 6, 2012, each of which is incorporated herein by reference in its entirety.

The present application is a continuation of U.S. application Ser. No. 13/910,557, which is a continuation-in-part application of PCT Application No. PCT/US13/25200 filed Feb. 7, 2013, which claims priority to U.S. Provisional Application Nos. 61/595,887 filed on Feb. 7, 2012, 61/656,206 filed on Jun. 6, 2012, and 61/679,973 filed on Aug. 6, 2012, each of which is incorporated herein by reference in its entirety.

The present application is a continuation of U.S. application Ser. No. 13/910,557, which is a continuation-in-part application of Ser. No. 13/857,685 filed Apr. 5, 2013, which claims priority to U.S. Provisional Application Nos. 61/656,206 filed on Jun. 6, 2012, 61/679,973 filed on Aug. 6, 2012 and 61/792,401 filed Mar. 15, 2013 and which is a continuation-in-part application of U.S. application Ser. No. 13/762,160 filed Feb. 7, 2013 and a continuation-in-part application of U.S. application Ser. No. 13/762,281 filed Feb. 7, 2013, each of which is incorporated herein by reference in its entirety.

The present application is a continuation of U.S. application Ser. No. 13/910,557, which is a continuation-in-part application of PCT/US13/35495 filed Apr. 5, 2013, which claims priority to U.S. Provisional Application Nos. 61/656,206 filed on Jun. 6, 2012, 61/679,973 filed on Aug. 6, 2012 and 61/792,401 filed Mar. 15, 2013 and 61/792,401 filed Mar. 15, 2013 and which is a continuation-in-part application of U.S. application Ser. No. 13/762,160 and a continuation-in-part application of U.S. application Ser. No. 13/762,281, each of which is incorporated herein by reference in its entirety.

FIELD OF THE INVENTION

The claimed invention relates to a system and method for normalizing, analyzing and codifying divergent color systems into a universal color system to facilitate dynamic analysis and color-based searching.

BACKGROUND OF THE INVENTION

At times, a user will want to search for a product by color even though it is an attribute that cannot be described adequately using words. For example, other than using rudimentary color names, such as "red" and "blue," searching for products of a particular shade using color as a parameter is extremely difficult, even when the color is relatively popular and intuitively should be easy to locate. For example, there are numerous colors which would fit the simple "red" or "blue" description, and searching using the textual word "red" is not likely to bring up the specific red or the specific product of interest. Also, searches based on a particular type of color by name, such as "rose red" or "ocean blue" are unlikely to turn up the color of interest, as there may be a number of different colors, each with a different name or with multiple names varying by the naming convention used. Similarly, searching for a pattern made of colors, such as "blue and red stripes" is unlikely to turn up the desired pattern of particular colors.

Many of the drawbacks involving color-based searching stem from the nature of internet searching, which has historically been text-based, thus requiring a user to enter text into a search engine to describe the information sought. With regard to color, textual color names are typically tagged or embedded beneath an image of a product or associated webpage as metadata, making it virtually impossible to obtain reliable and complete search results when specific color shades are sought. More specifically, because many search systems that implement searching based on a color (or a pattern) are operable only as text searching, a system may allow a user to select a color by name or even "click" on the color (in the form of a color swatch) and then search for the selected color. However, in these instances, the system typically converts the inputted search parameter to a text-string associated with or representing a particular color. For example, a search system may search based on clicking red swatch on a webpage but converts the click to a search for "red" as text, but not as an actual color. In such a system, the name of the color "red" is "tagged" to an image by way of a text string and the search is based by matching the input "red" to the text string "red" on the tag, and not to the color. From a consumer's perspective, such a system is insufficient to reliably capture all relevant products of a particular shade of red that are being sought. From a merchant perspective, such a system does not allow for dynamic analysis or codification of color that is a crucial but missing data set in understanding consumer preferences.

Another problem with contemporary color searching is a lack of universal color codification and unifying color-naming conventions. For example, even when a search using a specific color such as "cherry red" yields some relevant results when utilizing a search engine or a search field on a particular merchant's website (i.e., where the merchant utilizes the term "cherry red" as a tag to identify some of its products), such searches do not yield all of the relevant results for the particular type of red being searched. This is the case even when there are available products sold by other merchants that have the identical color or a close equivalent color but which use a term other than "cherry red" to identify that color.

Even color systems that offer naming conventions suffer from underlying drawbacks in their inconsistent application by merchant users and their vendors. For example, a wholesale buyer for a retailer may decide to order a line of products from a vendor in a color that is identified as "cobalt blue." A second wholesale buyer at the same retailer may order another line of products from a second vendor in a color that the second buyer also identifies "cobalt blue," having the intention that the colors be precisely the same so that a purchaser of product from the first line will be more inclined to purchase the second line of product as a matching set. Indeed, the variation in color between two products that purportedly have the 'same color' can be remarkable when the products are placed side by side. The lack of consistency among vendors and suppliers, even when the same color names are utilized, is often not appreciated until after the products arrive, at which time it is too late to ameliorate the situation.

Current systems further lack the ability to aggregate a user's preferred and/or customized colors onto a unified area or palette for purposes of identifying and searching for products. Also, use of the palette for forming color combinations and to perform searches based on a primary color and a secondary color (and a pattern) are lacking in the prior art. To that end, it would be beneficial to have that group of preferred colors identified, collected and readily available to that user in a single palette for effective color-based searching.

OBJECT AND SUMMARY OF THE INVENTION

Therefore, it is an object of the claimed invention to provide a system and method for normalizing, analyzing, and codifying divergent color systems into a single universal color system.

Another object of the claim invention is to provide aforesaid system and method that reverse maps merchants' color swatches to hexadecimal codes of the universal color system.

A further object of the claimed invention is to provide aforesaid system and method that translates contextual color identification into non-contextual color identification information to provide a universal color system, thereby codifying the color data.

A still another object of the claimed invention is to provide database(s) that both merchants and consumers can search for and match products using non-textual or color based queries.

A yet another object of the claimed invention is to provide aforesaid system and method that can classify patterns in the product image data.

In accordance with an exemplary embodiment of the claimed invention, a computer-based method is provided for normalizing and codifying divergent color systems into a single universal color system. A data feed comprising a plurality of color swatches or images from one or more merchant system is received by the middleware engine of the server over a communications network. The data feed is normalized into a common format and image data comprising a plurality of product images are extracted from the normalized data feed. Each product image is segmented into a plurality of segments by an image segmentation processor and each segment is analyzed to determine a dominant color for each segment by a dominant color processor. At least one dominant product color is determined for each product image based on prevalence of the dominant product color in each segment by the dominant color processor. The determined dominant product color is converted or translated into a digital value of the universal color system based on color component intensity values by a matched color processor. The data feed, each product image, each segment of each product image, the dominant color for each segment, the dominant product color for each product image, and the digital value of assigned to each product image are stored in a database by the server.

In accordance with an exemplary embodiment of the claimed invention, the aforesaid method assigns a hexadecimal code of the universal color system to each product image that is closest to the digital value of each product image by the matched color processor.

In accordance with an exemplary embodiment of the claimed invention, the aforesaid method determines a Euclidian distance between the digital value and each hexadecimal code of the universal color system based on their color component intensity values. The hexadecimal code yielding the shortest Euclidian distance is assigned to each product image by the matched color processor.

In accordance with an exemplary embodiment of the claimed invention, the aforesaid method receives the data feeds from a plurality of merchant systems by the middleware engine over the communications network. A product database generated from the data feeds received from the merchant systems is indexed and searchable by color-based queries.

In accordance with an exemplary embodiment of the claimed invention, the aforesaid method divides each segment until only one dominant color is identified in a subdivision by the image segmentation processor.

In accordance with an exemplary embodiment of the claimed invention, the aforesaid method depersonalizes the data received from the merchant systems to remove merchant or consumer identifying information by the middleware engine.

In accordance with an exemplary embodiment of the claimed invention, the aforesaid method generates a color histogram of dominant color for each segment. A parseable ordered list of dominant colors for each segment is generated from the color histogram by the dominant color processor.

In accordance with an exemplary embodiment of the claimed invention, the aforesaid method determines the dominant color of each segment on a pixel-by-pixel basis by the dominant color processor. The color appearing most frequently across all pixels being designated as the dominant color of each segment.

In accordance with an exemplary embodiment of the claimed invention, the aforesaid method extracts a pattern from each segment. The extracted pattern is compared to a predefined set of patterns stored in the database by a pattern identification processor to determine a product pattern.

In accordance with an exemplary embodiment of the claimed invention, the aforesaid method categorizes the pattern in each segment by determining proximity and frequency of two or more colors within each segment by the pattern identification processor.

In accordance with an exemplary embodiment of the claimed invention, a system for normalizing and codifying divergent color systems into a single universal color system comprises a server and a database. The server receives divergent color data from one or more merchant systems over a communications network, e.g., Internet, and processes and codifies the received divergent color data. The server comprises a middleware engine, an image segmentation processor, a dominant color processor and a matched color processor. The middleware engine receives a data feed comprising a plurality of color swatches or images from the merchant system, and normalizes the data feed into a common format. The image segmentation processor extracts the image data comprising a plurality of product images from the normalized data feed, and segments each product image into a plurality of segments. The dominant color processor analyzes each segment to determine a dominant color for each segment, and determines at least one dominant product color for each product image based on prevalence of the dominant product color in each segment. The matched color processor converts or translates the dominant product color to a digital value of the universal color system based on color component intensity values. The database stores the data feed, each product image, each segment of each product image, the dominant color for each segment, the dominant product color for each product image, and the digital value of each product image.

In accordance with an exemplary embodiment of the claimed invention, the aforesaid matched color processor assigns a hexadecimal code of the universal color system to each product image that is closest to the digital value of each product image.

In accordance with an exemplary embodiment of the claimed invention, the aforesaid matched color processor determines a Euclidian distance between the digital value and each hexadecimal code of the universal color system based on their color component intensity values. The matched color processor assigns the hexadecimal code yielding the shortest Euclidian distance to each product image.

In accordance with an exemplary embodiment of the claimed invention, the aforesaid middleware engine receives the data feeds from a plurality of merchant systems and aforesaid server generates a product database from the data feeds received from the merchant systems indexed and searchable by color-based queries.

In accordance with an exemplary embodiment of the claimed invention, the aforesaid image segmentation processor divides each segment until only one dominant color is identified in a subdivision.

In accordance with an exemplary embodiment of the claimed invention, the aforesaid middleware engine depersonalizes the data received from the merchant systems to remove merchant or consumer identifying information.

In accordance with an exemplary embodiment of the claimed invention, the aforesaid dominant color processor generates a color histogram of dominant color for each segment, and generates a parseable ordered list of dominant colors for each segment from the color histogram.

In accordance with an exemplary embodiment of the claimed invention, the aforesaid dominant color processor determines the dominant color of each segment on a pixel-by-pixel basis. The color appearing most frequently across all pixels being designated as the dominant color of each segment.

In accordance with an exemplary embodiment of the claimed invention, the aforesaid server further comprises a pattern identification processor for extracting a pattern from each segment, and comparing the extracted pattern to a predefined set of patterns stored in the database to determine a product pattern.

In accordance with an exemplary embodiment of the claimed invention, the aforesaid pattern identification processor categorizes the pattern in each segment by determining proximity and frequency of two or more colors within each segment.

In accordance with an exemplary embodiment of the claimed invention, a non-transitory computer readable medium comprises computer executable code for normalizing and codifying divergent color systems into a single universal color system. The middleware engine is instructed to receive a data feed comprising a plurality of color swatches or images from a merchant system over a communications network, and normalizes the data feed into a common format. The image segmentation processor is instructed to extract the image data comprising a plurality of product images from the normalized data feed and segment each product image into a plurality of segments. The dominant color processor is instructed to analyze segment to determine a dominant color for each segment, and determine at least one dominant product color for each product image based on prevalence of the dominant product color in each segment. The matched color processor is instructed to convert the dominant product color to a digital value of the universal color system based on color component intensity values. The database is instructed to store the data feed, each product image, each segment of each product image, the dominant color for each segment, the dominant product color for each product image, and the digital value of each product image.

The claimed invention may stand on its own or serve as an enhancement of or upgrade to existing IMS and/or SCM systems directed to facilitating a wide range of functions, including search, product selection, purchase, marketing, advertising, product planning and sales. The claimed invention can apply operations research principles to selected problems in retailing by organizing and identifying products according to color and/or pattern and by using those attributes as primary indicators, where retailing extends from product development and manufacturing through customer service.

In accordance with an exemplary embodiment of the claimed invention, aforesaid system and method can be utilized to dynamically analyze codified color-based preferences, trends and system-wide activities to make targeted and micro-targeted product recommendations to users with color as a primary product attribute.

Generally, the claimed invention provides a system, methods and a set of interfaces that provide users and merchants with a number of previously unavailable opportunities and tools in the context of color identification, selection and matching. The non-textual color searches utilizing the universal color codes provide users with relevant search results for a number of merchant products that correlate more closely (or exactly) to the colors for which a user is searching.

With respect to the hardware of the system, CPU-based servers are arranged to communicate with one another and with one or more data warehouses, preferably residing therein, which are used to store user data, merchant data, product data, and color data.

Various other objects, advantages and features of the present invention will become readily apparent from the ensuing detailed description, and the novel features will be particularly pointed out in the appended claims.

BRIEF DESCRIPTION OF THE DRAWINGS

The above-described and other advantages and features of the present disclosure will be appreciated and understood by those skilled in the art from the following detailed description and drawings of which.

DETAILED DESCRIPTION OF THE EMBODIMENTS

In accordance with an exemplary embodiment of the claimed invention, non-textual color-based systems, methods and interfaces are provided to collect, analyze, manage and codify divergent color data into a unified or universal color system. The universal color system of the claimed invention advantageously enables the users (e.g., customers and/or merchants) to search and match products based on color and not based certain textual representation of color. One of the most important factors that influence consumer purchase decisions is color, accordingly, the claimed invention proceeds upon desirability providing a system and method for searching and matching products based on color to provide consumers with in-store shopping experiences while shopping online.

In accordance with an exemplary embodiment of the claimed invention, the claimed color-based system and method can additionally collect, analyze and manage other non-color data, such as textual product data, and anonymous user and merchant data, to provide a more robust product searching and purchase experience for users and a more effective means for merchants to target, advertise and sell to consumers.

Figure 1:
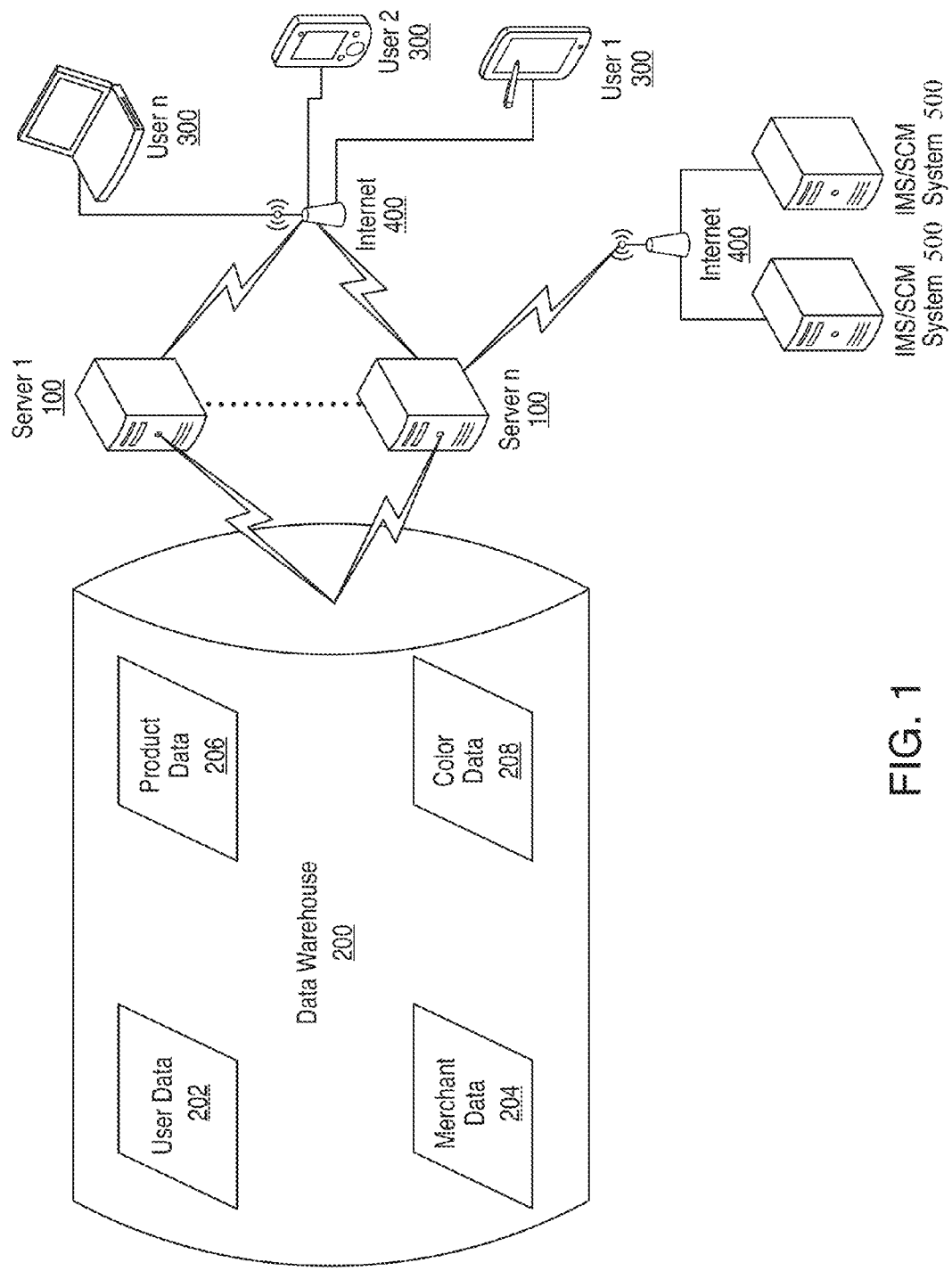
FIG. 1 is a block diagram of the system in accordance with an exemplary embodiment of the claimed invention.

Turning to FIG. 1, there is shown, in accordance with an exemplary embodiment of the claimed invention, an exemplary system configuration comprising a processor-based machine, such as computer(s) or server(s) 100, with hard disk or memory drives running software comprising machine-readable program instructions. Server 100 serves as and/or provides access to data warehouse 200, which comprises product data 206 and color data 208. Preferably, the data warehouse 200 also comprises user data 202, and merchant data 204. All data are maintained in data warehouse 200 or other conventional database system having read and write accessibility using a database management system. Although described herein for illustrative purposes as being separate data stores, in at least some alternative embodiments, the data stores may be combined in various combinations.

Information contained in data warehouse 200 is accessible by both consumer and merchant users via client devices 300 over a communications network 400, such as the Internet 400. Client devices 300 comprise processor-based machine(s), such as laptops, PCs, tablets and/or other handheld devices to and from which server 100 communicates. Client devices 300 are connected to server 100 utilizing customizable interfaces described herein. Custom interfaces may be in the form of a graphical user interface, an application to form a client-server arrangement and/or other well-known interface conventions known in the art. Depending on the nature of the user and its access to various forms of information, different interfaces are made available. To support various options, the system of the present invention preferably includes at least one application-programming interface (API) so that certain types of users could enhance their interfaces, and different ones may be available for users and merchants.

Figure 11:
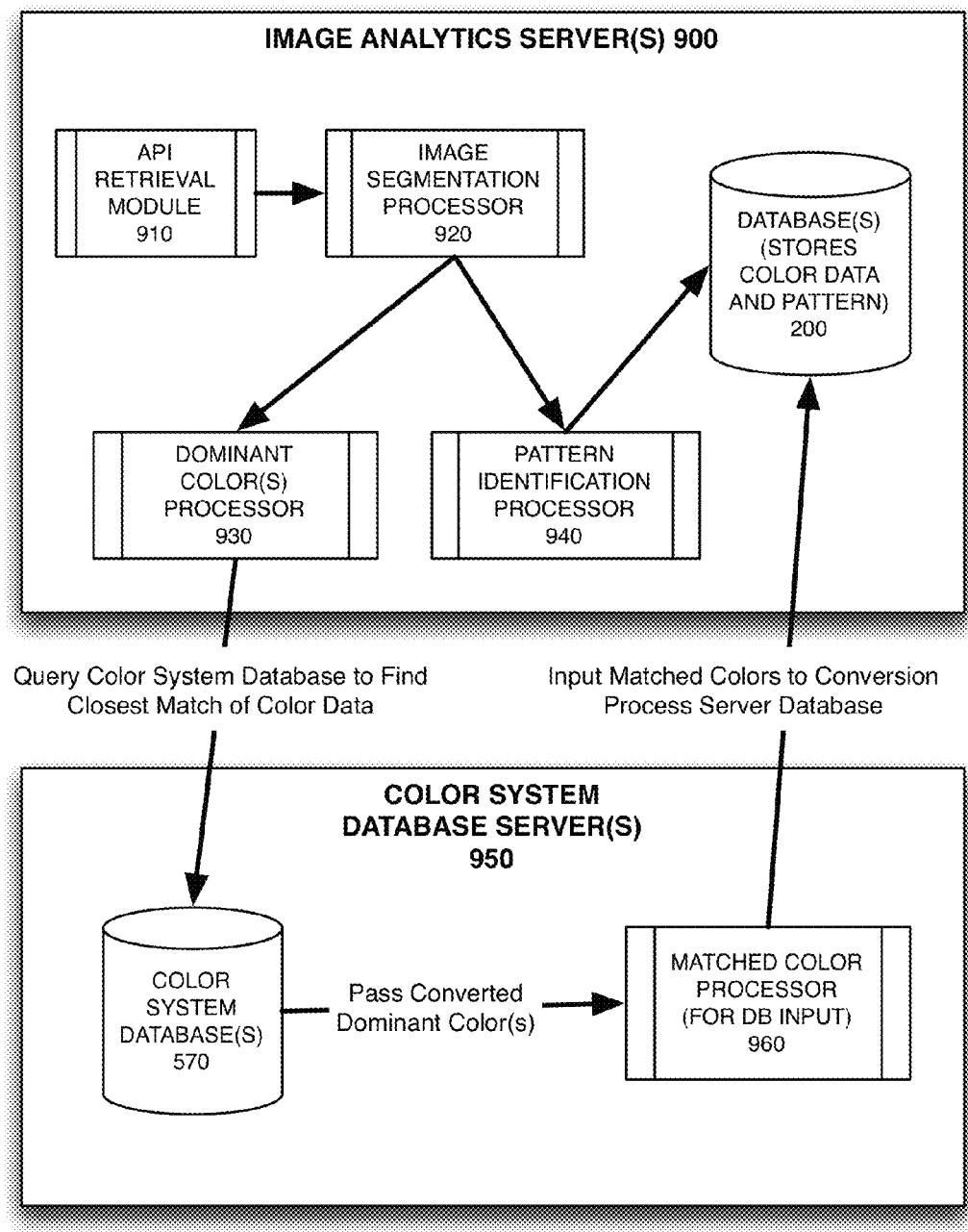
FIG. 11 is block diagram of the image analytics server in accordance with an exemplary embodiment of the claimed invention.

In accordance with an exemplary embodiment of the claimed invention, the server 100 stores/maintains hexadecimal and RGB color identification information and pattern identification information in a core color database 570. Each individual color identification entry corresponds to one of a plurality of uniform/universal colors stored in the core color database 570 and each individual pattern identification entry corresponds to one of a plurality of selectable patterns stored in the core color database 570. The color engine or processor 550 of the server 100 dynamically analyzes the color and pattern identification information to determine and associate dominant colors and patterns with a particular product. It is appreciated that for certain resource intensive applications, such as processing a large volume of feeds 510 from multiple merchants, as shown in FIG. 11, the claimed system can comprise one or more separate image analytics server(s) 900 for performing the dynamic image/swatch analysis 560 instead of the color engine 550. Due to its common functionalities, the color engine 550 and the image analytics server 900 will be interchangeably herein.

In accordance with an exemplary embodiment of the claimed invention, the server 100 receives product information (i.e., feeds) over the communications network 400 from a plurality of merchants. Preferably, the server 100 receives the feeds from retailers', wholesalers', and/or manufacturers' inventory management systems or supply chain management systems 500 (collectively referred to herein as "IMS/SCM systems"). Preferably, as new products are added or product information is updated in the IMS/SCM system, the corresponding information is transmitted to the server 100. That is, the IMS/SCM system dynamically transmits the updated information to the server 100.

Since information relating to products provided by different merchants is often expected to be formatted differently from one another, data received from various merchants are transformed or normalized to a common format (e.g., an image of predetermined size, such as 500 pixels by 500 pixels), so that the information can be processed consistently and efficiently by the server 100. In accordance with an exemplary embodiment of the claimed invention, a middleware engine 520 of the server 100 receives IMS/SCM data feeds 510 comprising textual and non-textual (color) product information from the IMS/SCM system 500 and normalizes or transforms the data. The middleware engine 520 integrates and manages incoming data as the data is transmitted from IMS/SCM systems 500 to server 100. That is, the middleware engine 520 manages the interaction between the otherwise incompatible applications residing on the server 100 and merchant IMS/SCM systems 500. Preferably, the middleware engine 520 normalizes or transforms the IMS/SCM data feeds 510 into single item data format so that the data can be efficiently organized in an item table 540.

In accordance with an exemplary embodiment of the claimed invention, the middleware engine 520 performs digital image analysis (DMI) by ingesting or consuming programmatically flat digitally encoded images or extracted flat images from encoded digital video such as via a web-based graphical user interface (GUI), application program interface (API), or other known programmatic methods. The middleware engine 520 stores the ingested data from the external feed 510, such as IMS/SCM feed 510, in the data warehouse 200. As part of the ingestion process, the middleware engine 520 normalizes and stores the data such that the item table 540 contains available product information from the proprietary merchant IMS/SCM system 500, including textual and non-textual (color) product information.

In accordance with an exemplary embodiment of the claimed invention, the system, methods and interfaces described herein are designed to operate in a 4096 universal color environment, but on a scale which allows the system to expand to over 16 million universal colors using the full range of 256 color intensities (measured from 0 to 255) for each of R (Red), G (Green) and B (Blue) which yields $256^3$ or 16,777,216 possible color variations, and hence potential 16 million universal color codes or classifications. The claimed invention translates contextual color identification information into non-contextual color identification information to generate a universal color system to codify color data. Preferably, the 4096 selectable universal colors are equidistantly spaced along the full scale of available colors. However, it should be understood that the selectable colors may be moved along the scale or added or subtracted in order to provide more or less variation in a particular color region, depending on user and merchant trends or needs.

In accordance with an exemplary embodiment of the claimed invention, as shown in FIG. 11, the image analytics sever 900 comprises an API retrieval module 910, an image segmentation processor 920, a dominant color processor 930 and a pattern identification processor 940. The image analytics server 900 initiates the dynamical image analysis and color conversion process 560 by instructing the API retrieval module 910 to retrieve the normalized image data from the data warehouse 200. The color engine 550 or the image analytics server 900 converts colors based on component intensities to a digital value, preferably an universal 24-bit, 6-digit hexadecimal code which uses a base sixteen number instead of conventional base ten numbers, two digits for each of the Red, Green and Blue values. Similarly, the image analytics server 900 can express colors as a concatenation of digital values for R, G and B components of a color and assigned the concatenated digital values to a product as a color identifier. For example, if a particular color exhibits RGB values: 189 Red: 202 Green: 220 Blue, that number can be converted to a hexadecimal value BDCADC. 189 corresponds to BD in hex notation, 202 corresponds to CA in hex notation and 220 corresponds to CD in hex notation.

In accordance with an exemplary embodiment of the claimed invention, the middleware engine 520 normalizes data from plurality of merchants and the image analytics server 900 converts the merchants' color data into universal color codes, preferably, a universal hexadecimal color code. It is appreciated that universal color code can be expressed as RGB component measurements or other digital representation. That is, the image analytics server 900 dynamically analyzes and converts the color swatch to a universal 24-bit hexadecimal color code, thereby codifying the non-uniform colors used by various merchants into a universal hexadecimal color code.

In an accordance with an exemplary embodiment of the claimed invention, during the normalization process 530, the middleware engine 520 also strips away merchant identification information (merchant IDs) that could be used to relate product information to a specific merchant. Accordingly, the claimed invention stores depersonalized information by removing merchant IDs from the data, thereby de-linking merchant information from the products. This eliminates the possibility of competitors having access to sensitive or proprietary information.

As a result of previously adopted color naming conventions by a merchant or as a result of merchant-vendor practices which are ostensibly incompatible with assigning a universal color code to a given product, the color data of the ISM/SCM feed 510 needs to be converted or reverse mapped to the hexadecimal color code of the universal color system. The image analytics server 900 performs the dynamic image/swatch analysis 560 to analyze, convert and reverse map the merchant's product color to the claimed universal hexadecimal color code. In accordance with an exemplary embodiment of the claimed invention, the image analytics server 900 receives, dynamically analyzes and converts the merchant's color swatch, preferably digital color swatch, alone or in combination with a merchant color name (or names) for that color swatch to an universal color code at step 590.

Figure 2:
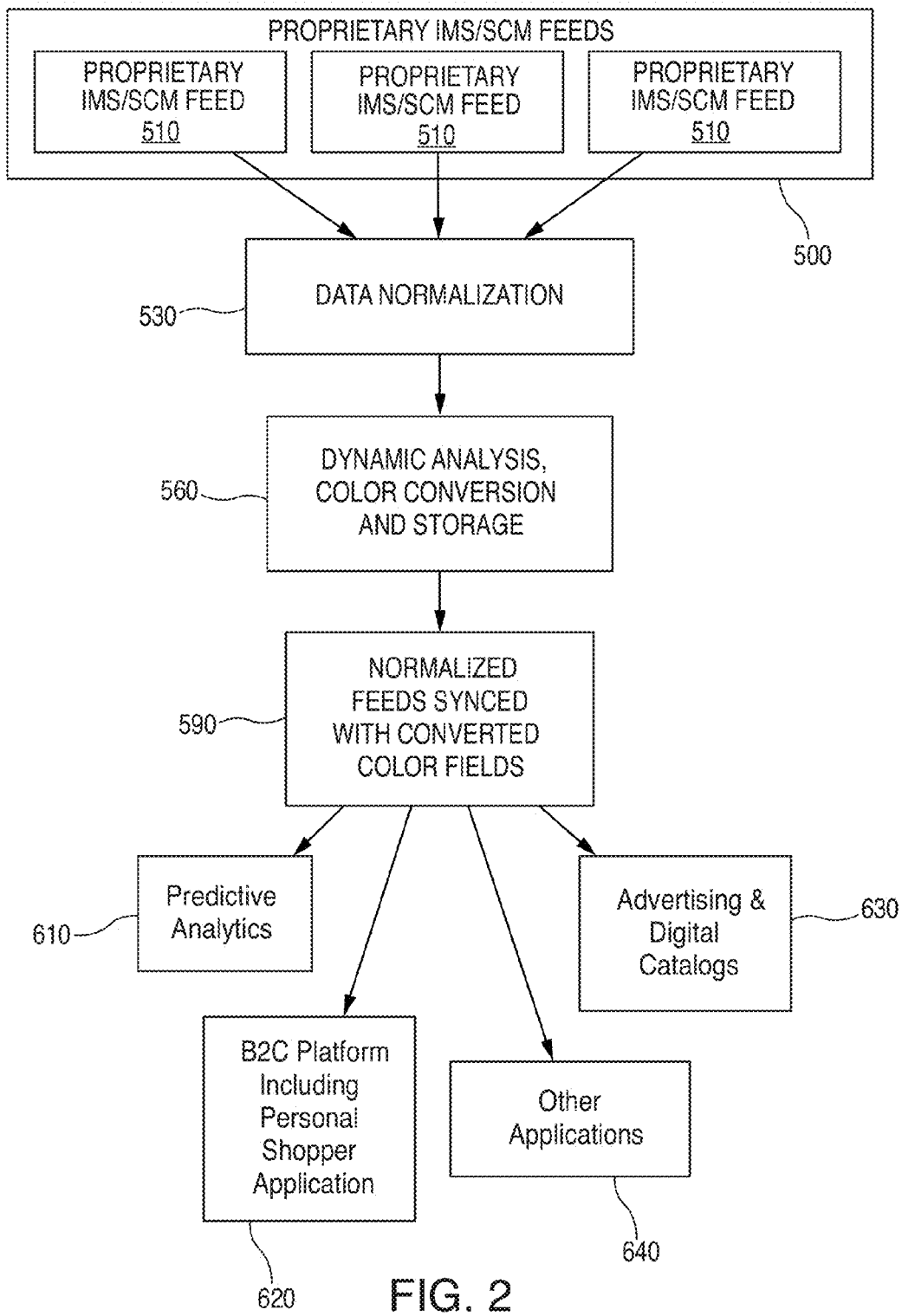
FIG. 2 is a flow chart depicting an exemplary process for normalizing and codifying divergent colors from a plurality of merchant IMS/SCM systems into a single universal color system in accordance with an exemplary embodiment of the claimed invention.
Figure 3A:
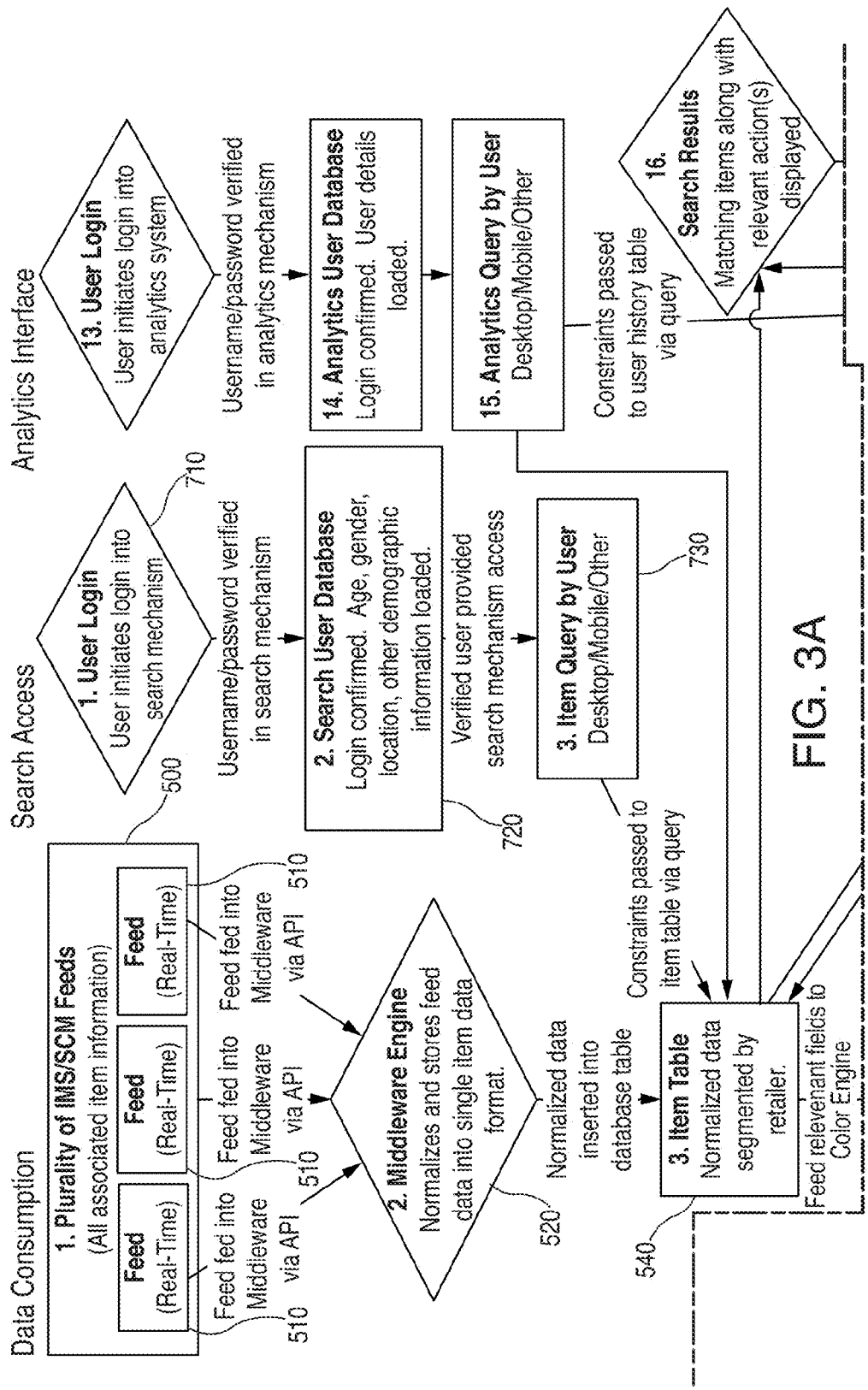
FIGS. 3A and 3B together comprise an exemplary system diagram depicting interaction among various system components to normalize, analyze and codify divergent merchants' color systems into a single universal color system in accordance with an exemplary embodiment of the claimed invention.
Figure 3B:
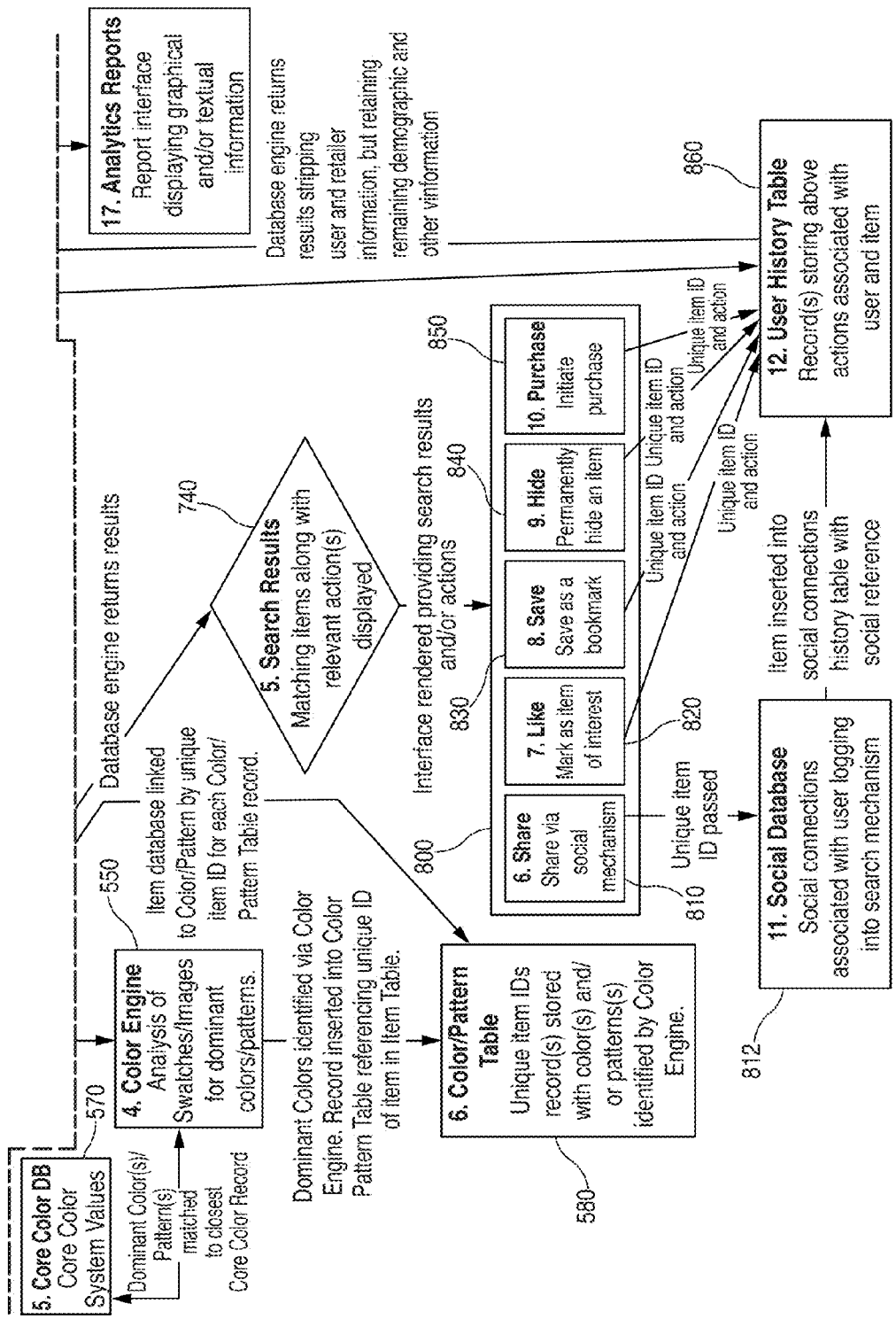
Figure 4:
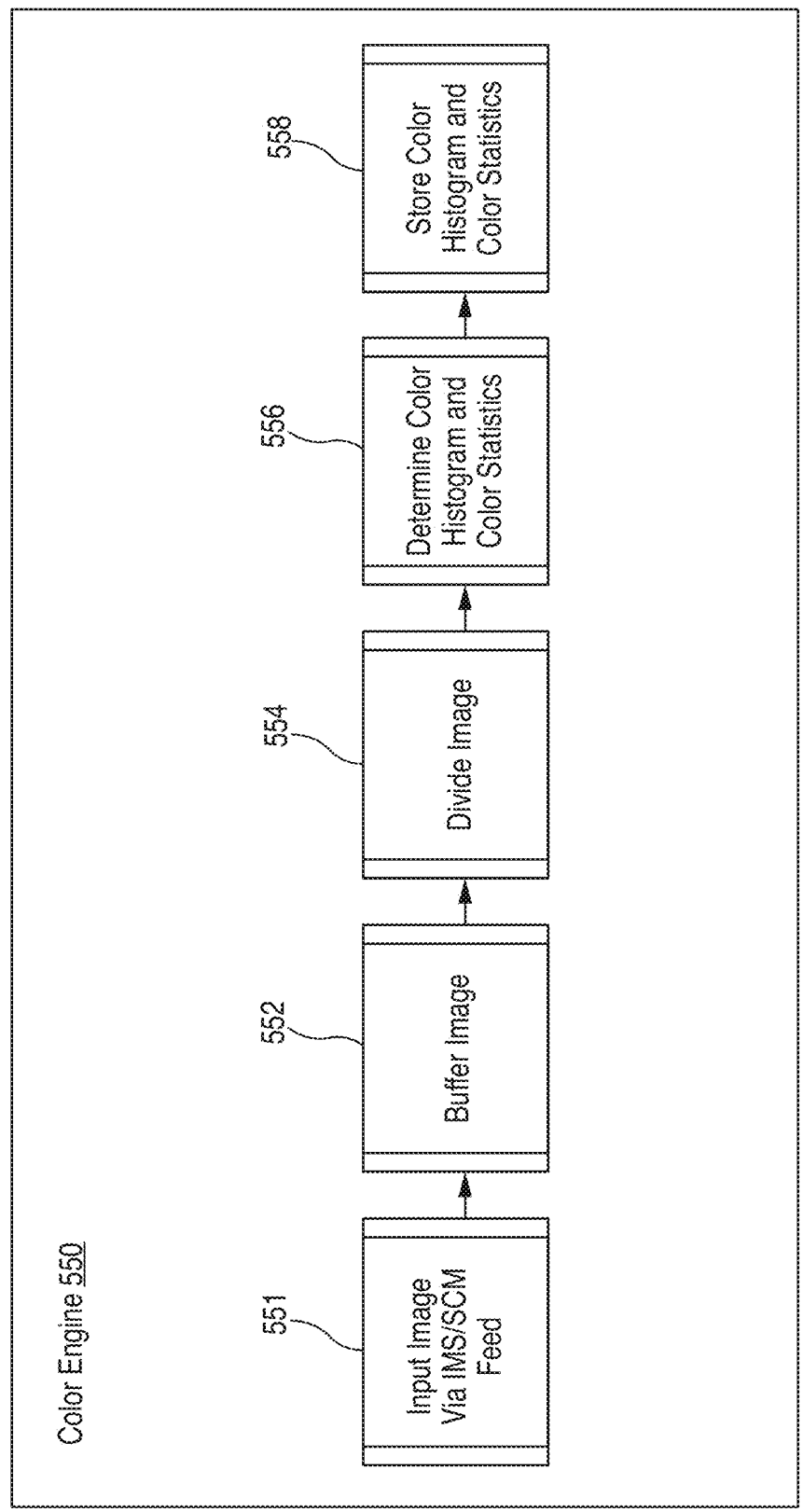
FIG. 4 is an exemplary flow chart depicting the dynamic color analysis of codifying and reverse mapping a merchant's color system to the claimed single universal color system by the color engine in accordance with an exemplary embodiment of the claimed invention.

The middleware engine 520 transforms or normalizes the IMS/SCM feed 510 comprising merchant's color swatch and preferably, merchant's textual product data. In accordance with an exemplary embodiment of the claimed invention, the image analytics server 900 performs dynamic image/swatch analysis 560 on the normalized data received from the middleware engine 520 to determine its dominant color(s) and/or pattern(s). As shown in FIGS. 2-4, the image analytics server 900 or color engine 550 gathers and dynamically processes the image or color swatch present in the proprietary merchant data feed 510 to determine and map the color swatch to an universal color code at step 590. The color engine 550 dynamically analyzes the color swatch to determine and store the dominant color(s) and pattern(s) as color data 208 in data warehouse 200.

Figure 8:
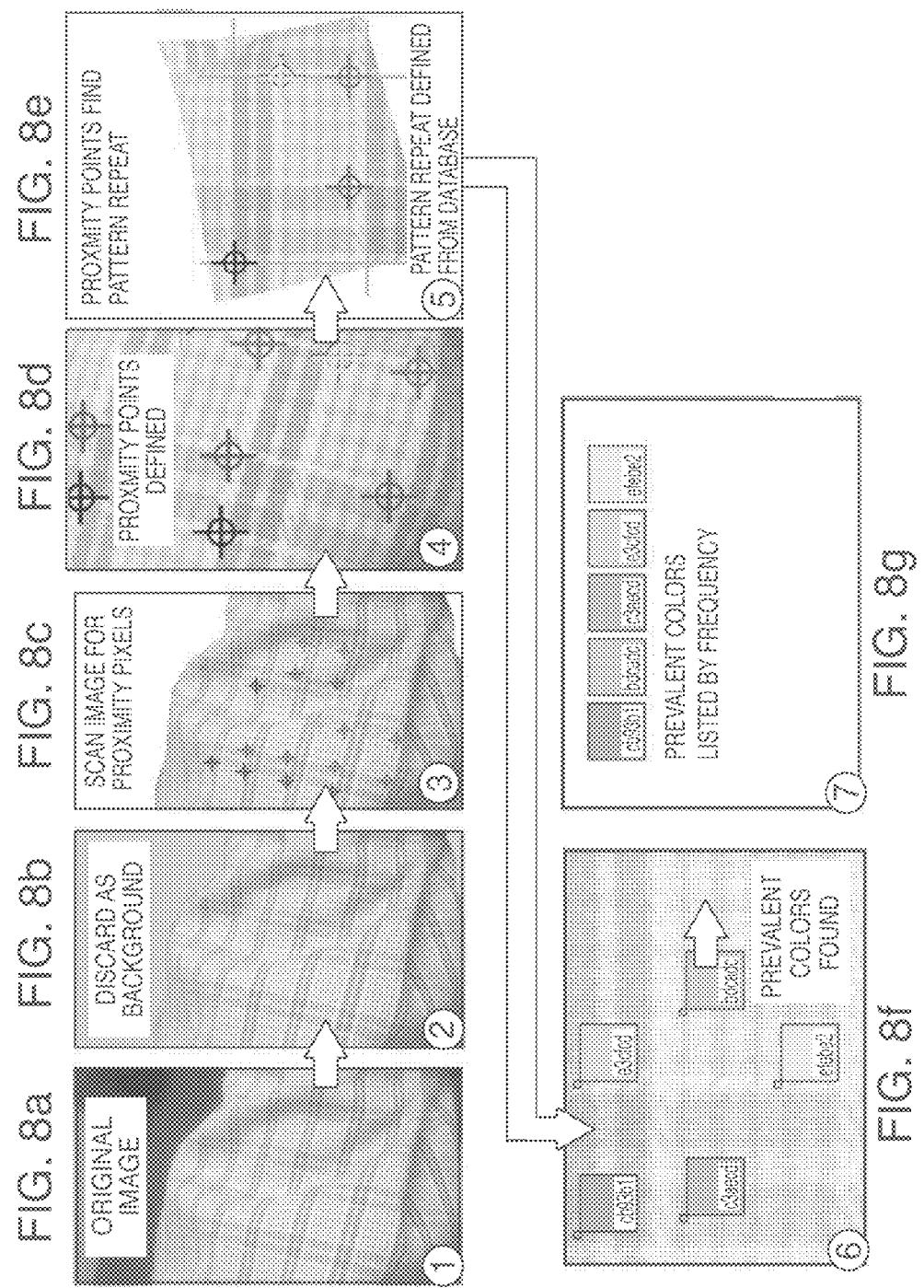
FIGS. 8a through 8g illustrate an exemplary process for identifying and recognizing color(s) and/or pattern(s) from a image of a striped shirt pattern by the image analytics processor in accordance with an exemplary embodiment of the claimed invention.

In accordance with an exemplary embodiment of the claimed invention, as shown in FIGS. 4 and 8, the color engine 550 or the image analytics server 900 dynamically analyzes images or swatches received as part of the data feed 510 from the merchant's system 500, preferably merchant's IMS/SCM system 500, to determine the color(s) and/or pattern(s) of merchant's products. The image analytics server 900 stores the universal color code obtained as a result of the analysis as color data 208 in the data warehouse 200. That is, the image analytics server 900 extracts color information from the data feed 510 to codify or map the merchant's color swatch to a universal color code. As shown in FIG. 4, at step 551, the API retrieval module 910 receives a color swatch or image as a normalized data input from the merchant's system 500, preferably merchant's IMS/SCM system 500, via the middleware engine 520. The image analytics server 900 buffers the color swatch at step 552 and the image segmentation processor 920 divides the color swatch into a plurality of sub-images to determine the dominant colors at step 554. Thereafter, the dominant color processor 930 determines the dominant color(s) of each sub-image at step 556 to assign a numerical color value, preferably, a hexadecimal value, to the color swatch. The dominant color processor 930 also determines and stores a color histogram and statistical data that may include detailed RGB band information, including the mean, standard deviation and minimum value and maximum value associated with each of the RGB bands, at step 558.

While swatches or images that contain a single dominant color are easier to classify by color, there are many instances where the image analytics server 900 must parse an image to make accurate color and/or pattern determinations. The dynamic image analysis 560 of merchant's color swatches or images with multi-colored patterns can be resource intensive for the image analytics processor 550 to extract the necessary color information. Depending on the volume of images received from the merchant's IMS/SCM system 500, a dynamic resource server or a cluster of dedicated servers 100 may be required to provide the necessary computational power, memory and storage to normalize, analyze and codify the data feed 510 containing these images or color swatches.

Figure 10:
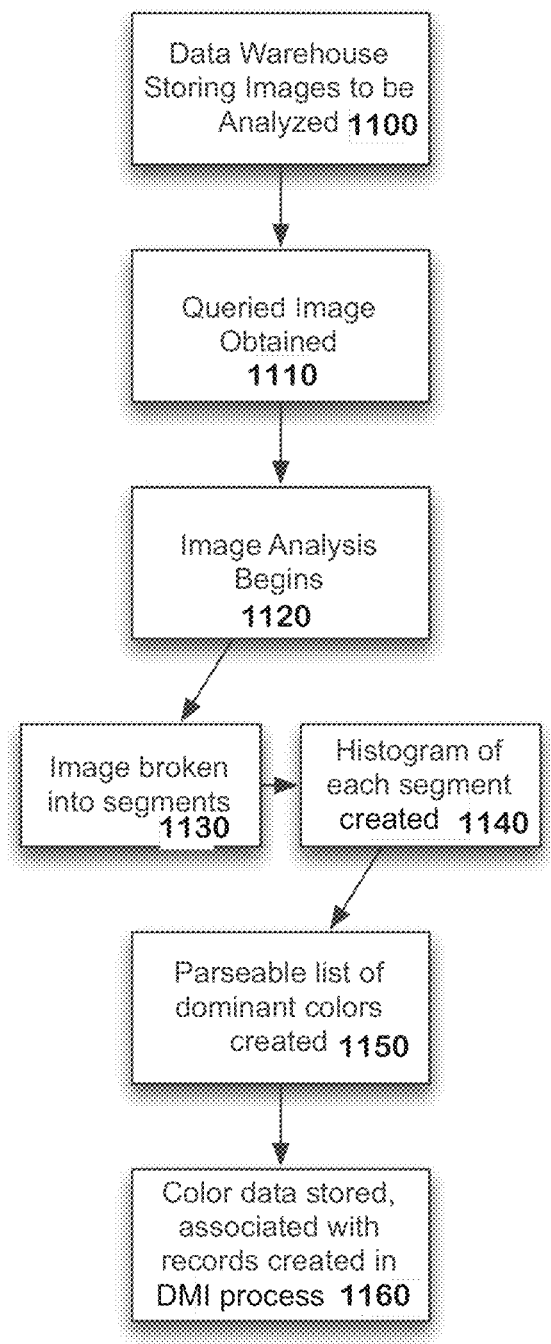
FIG. 10 is a flow chart depicting an exemplary process for extracting color data by segmenting the product image into a plurality of regions in accordance with an exemplary embodiment of the claimed invention.

In accordance with an exemplary embodiment of the claimed invention, the image analytics processor 550 segments, breaks or divides the image into a digestible format, e.g., four or more sections or quadrants. As exemplary shown in FIG. 10, the middleware engine 520 stores ingested images from the outside feed, such as IM/SCM feed 510, in the data warehouse 200 at step 1100. The image analytics processor 550 obtains stored image from the data warehouse 200 at step 1110 and performs dynamic image analysis 560 to determine colors, preferably, dominant colors, of the image at step 1120.

Figure 5:
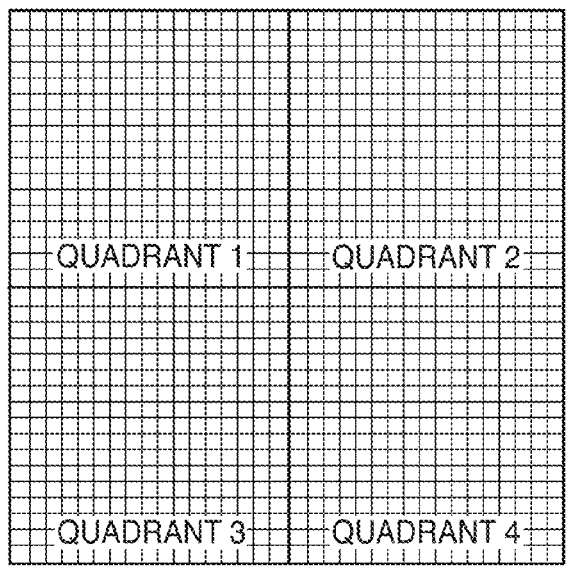
FIG. 5 illustrates an exemplary four-quadrant framework, each subdivided into a 16×16 grid into which a swatch or image is divided for processing by the color engine in accordance with an exemplary embodiment of the claimed invention.

The image segmentation processor 920 segments the retrieved image into a plurality of regions at step 1130 and the dominant color processor 930 analyzes each region to generate a color histogram for each region at step 1140. Typically, the size of images contained in merchant's data feed 510 is known. For unknown image size, the middleware 520 or the image segmentation processor 920 can modify or resize the image to a predetermined size, such as 500 pixels by 500 pixels, thereby normalizing the image size for efficient and uniform image processing. As exemplary shown in FIG. 5, the image segmentation processor 920 can segment or divide the image into a four-quadrant grid, each grid subdivided into 16×16 cells, and analyzes the subdivided image to determine the dominant color(s) and/or pattern(s) of the image. As each quadrant is analyzed, the dominant color processor 930 updates and reassess the resulting data to adjust its determination of the dominant color(s) and/or pattern(s) of the color swatch or image. From the color histogram, the dominant color 930 generates a parseable, ordered list of colors ranking the most dominant colors in each segment at step 1150.

In accordance with an exemplary embodiment of the claimed invention, the image segmentation processor 920 may perform successive subdivisions such that a given cell or sub-image may be further divided or segmented into another grid, or another set of sub-images. Successive segmentations of images may be necessary for the dominant color processor 930 and/or pattern identification processor 940 to analyze and classify complex patterns or images with various combinations of colors and patterns. Preferably, the image segmentation processor 920 further segments the image by reducing the image segment height by half and/or the image segment width by half if it cannot determine the dominant color within a predetermined threshold, e.g., 80% accuracy or certainty. Such determinations are made by determining and analyzing the frequency, quantity, and repeat of colors and/or patterns within the image by the image analytics server 900. Accordingly, in addition to color determination, the image analytics processor 900 isolates, analyzes and identifies patterns in the image, such as stripe, checkered, hounds tooth, paisley. The divided parts/sections of the image are "read" and analyzed by the image analytics server 900 to determine the dominant color(s) and pattern(s) appearing therein.

In accordance with an exemplary embodiment of the claimed invention, the dominant color processor 930 determines the dominant color by identifying the color values across all pixels in each of the cells of the grid, including mean values and standard deviations. In a basic example where an image or color swatch contains only one color and no pattern, the dominant color processor 930 identifies the image based on the color appearing most frequently across all cells and assigns the hexadecimal value (and/or RGB values) associated with the identified color to the image. That is, the dominant color processor 930 compares the ordered lists of dominant colors and determines the most dominant color(s) within the entire image to be the color(s) that appear in the majority of segments with the highest frequency at step 1150. The dominant color processor 930 associates and stores the dominant colors determined for the product corresponding to the analyzed image and other color data, such as the ordered list of dominant colors in the data warehouse 200 at step 1160. The image analytics server 900 dynamically converts the determined dominant color(s) for the product image into the universal hexadecimal color system. It is appreciated that the claimed system can also utilize other color models, such as HSV (hue, saturation, value), HSL (hue, saturation, lightness), CMYK (cyan, magenta, yellow key). The image analytics server 900 applies a curve to color histogram to allow for luminance variance in the extracted RGB colors, e.g., 5-15% color variance along each of the bands when determining color dominance in a particular image. This allows for color variations in an image that are based on lighting conditions and shading, but not due to the presence of a different color in the image. Preferably, the dominant color processor 930 eliminates background noise (flat colors) that is not related to the object contained within the image, such as white background. Of course, it should be understood that the dominant color processor 930 can utilize a similar process to determine that multiple dominant colors are present in a single image, particularly when there are stark color contrasts in an image and increased frequency of two or more distinct colors.

Figure 6A:
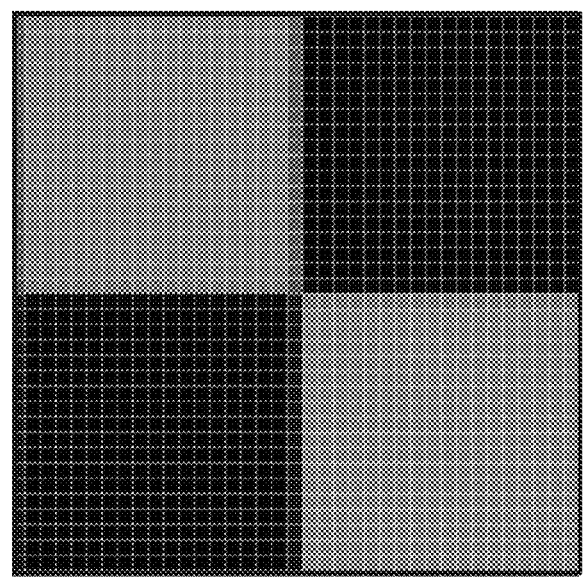
FIG. 6a illustrates an exemplary grayscale representation of a red and black checkered pattern for color and pattern recognition by the image analytics processor in accordance with an exemplary embodiment of the claimed invention.

With respect to pattern recognition, the pattern identification processor 940 analyzes the product image for any potential patterns when the dominant color processor 940 detects multiple dominant colors in the image segment. The pattern matching process will be described herein using a basic checkered pattern as shown in FIG. 6a. Prior to assigning a universal hexadecimal value to the pattern or its constituent colors, the pattern identification processor 940 compares and matches the pattern to a predefined set of patterns maintained in the core color database 570. For example, the predefined set of patterns can include but is not limited to checkered, striped, paisley, polka dot, floral, etc. The pattern identification processor 940 analyzes and processes product images to associate the patterns to each product. Preferably, the claimed invention incorporates sub-classifications of each of the patterns to provide more robust classification. In this instance, a red and black-checkered pattern is presented to the image analytics server 900 for pattern and color determination. When analyzing the pattern, the pattern identification processor 940 determines the proximity and repeated frequency of two or more colors. For example, where the first color that is detected in a 3×3 pixel/unit square is next to another color that is detected in a 3×3 pixel/unit square, then followed by the first color in the same configuration, the pattern identification processor 550 determines and classifies the pattern as a checkered pattern and assigns a "checker" value to the image. After the pattern is defined and classified with a pattern value, the dominant color processor 930 identifies the colors detected within in the pattern (in this case a checker pattern). Thereafter, the matched color processor of the color system database server 950 assigns universal hexadecimal values corresponding to the dominant red and black colors appearing in the image.

Figure 6B:
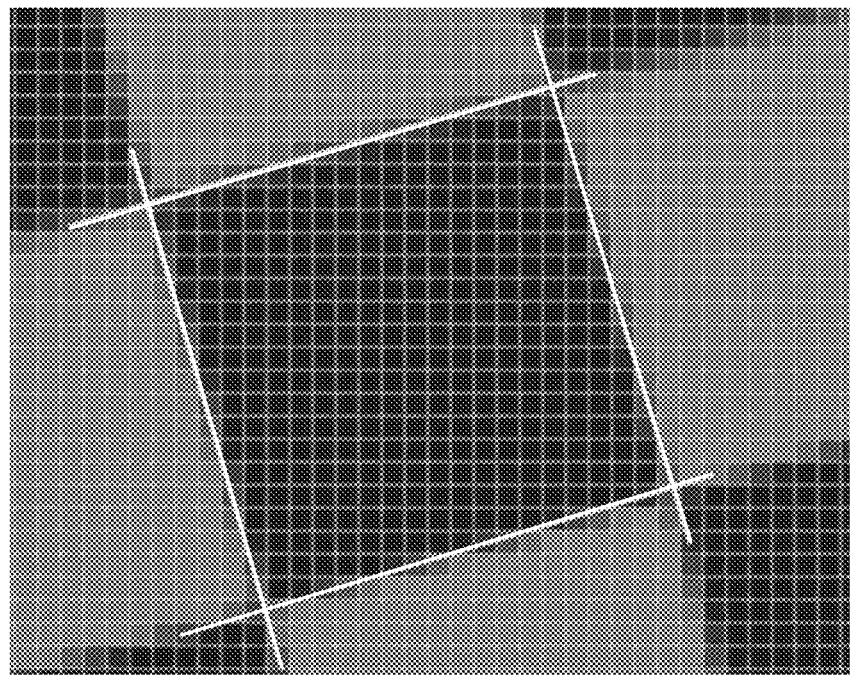
FIG. 6b illustrates an exemplary grayscale representation of a rotated red and black checkered pattern for color and pattern recognition by the image analytics processor in accordance with an exemplary embodiment of the claimed invention.

In accordance with an exemplary embodiment of the claimed invention, the pattern identification processor 940 can account for patterns that are rotated within the processed image, as shown in FIG. 6b. Even though the border between the red and black colors is jagged when the image is processed, the pattern identification processor 940 processes the borders as a straight line with a 90 degree angle separating the edges of the same color. With that information, as with FIG. 6a, the pattern identification processor 940 analyzes and determines that the image pattern as a red and black checkered pattern by comparing the image pattern to the pre-stored patterns in the core color database 570.

In accordance with an exemplary embodiment of the claimed invention, the pattern identification processor 940 can account for patterns that are distorted or stretched within the processed image. The pattern identification processor 940 divides the distorted image further into smaller areas until it recognizes a pattern as being a red and black-checkered pattern by comparing the image pattern to the pre-stored patterns in the core color database 570. The number of regions in the initial or later division(s) may be based on the digital size of the image or swatch, on a defined quantity, historical analysis or another conventional basis well known in the field of image recognition.

In accordance with an exemplary embodiment of the claimed invention, the image analytics server 900 performs successive subdivisions of a given image or swatch to formulate a more precise representation of the color and pattern values which are present in the image. Without this process, an average color value of an entire image still can be determined. However, the color value associated with the image would in many instances be an extremely poor representation of the actual colors in the image and of the product therein. For example, where a given image contains many different colors, the average color value of the entire image may yield a grayish tone as opposed to various distinct colors that formulate the image. Thus, the image analytics server 900 subdivides the image and analyzes each subdivided section independently from the others to capture the various dominant colors of the image. In accordance with an exemplary embodiment of the claimed invention, the image analytics servers 900 subdivides the images into arrays of cells to accurately and precisely represent the color values (e.g., color histogram and color statistics) of the image.

Figure 6C:
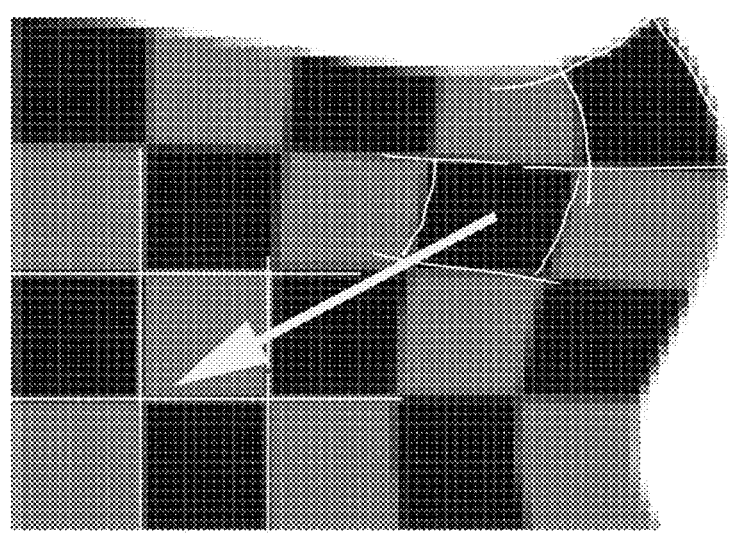
FIG. 6c illustrates an exemplary grayscale representation of a partially distorted red and black checkered pattern for color and pattern recognition by the image analytics processor in accordance with an exemplary embodiment of the claimed invention.
Figure 7:
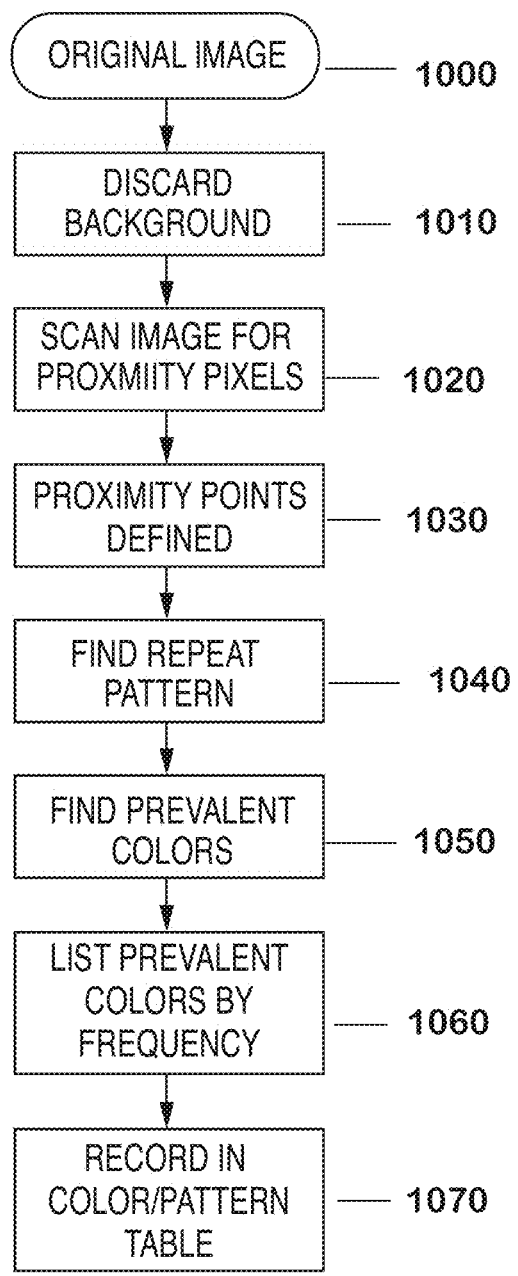
FIG. 7 is a flow chart depicting an exemplary process for identifying and recognizing color(s) and/or pattern(s) by the image analytics processor in accordance with an exemplary embodiment of the claimed invention.

Turning now to FIGS. 7 and 8a-8g, in accordance with an exemplary embodiment of the claimed invention, the image analytics server 900 normalizes and codifies colors and patterns from digital photographic images or swatches of products received from the merchant system 500 into a universal color system, thereby enabling dynamic analysis of products based on colors and other parameters. The image analytics server 900 receives a digital photographic image or swatch of a shirt with patterns for processing and recognition at step 1000. The image analytics server 900 isolates or extracts the relevant product pattern and color from the rest of the image, with the irrelevant portion of the image being deemed background or "whitespace" and discarded at step 1010. The image analytics server 900 scans the image for proximity pixels at step 1020 and defines proximity points at step 1030. Once the proximity points are defined, at step 1040, the image analytics server 900 searches the image for a repeat pattern in the product-utilizing pattern repeat parameters defined in the core color database 570. Depending on the extent of pattern distortion of the product appearing in the image, as discussed herein with respect to FIG. 6c, the image analytics server 900 further subdivides the image until it can identify and determine the repeat pattern of the product.

In accordance with an exemplary embodiment of the claimed invention, the pattern identification processor 940 compares the repeat pattern to the predefined set of patterns stored in the core color database 570 to classify or determine the product pattern. Once the pattern is classified, the dominant color processor 930 categorizes or determines the prevalent or dominant colors of the product at step 1050. The matched image analytics server 900 codifies or converts the identified colors into the hexadecimal values of the universal color system and preferably, lists the identified colors by its prevalence or frequency (i.e., the number of times a particular color appears in the product image), as exemplary shown in FIG. 8g, at step 1060. For example, the dominant color processor 930 and the matched color processor 960 can identify the following five dominant colors represented by their universal hexadecimal values CB93B1, BDCADC, C3AECD, E3CFCD and EFEBE2. After all of these colors and the pattern are identified, the image analytics server 900 associates the identified colors and/or patterns with this particular shirt and stores these codified color and pattern data as the product data 206 in the data warehouse 200.

When analyzing patterns of multiple colors such as the one shown in FIG. 8a, the image analytics server 900 identifies colors by sampling selected spots in a given region of the image. When the sampling indicates that more than one color might exist, the image analytics server 900 further samples and/or further subdivides the image, and may continue the process iteratively until only one color is identified in the subdivision or the image subdivision is reduced to a single pixel. In accordance with an exemplary embodiment of the claimed invention, the image segmentation processor 920 selects the sizing or subdivisions based on the number of colors identified in a region, the deviation of values of the colors in a region (as compared to a predetermined threshold), or some other criteria. The dominant color processor 930 analyzes each region's color values, for example on a pixel-by-pixel basis. In addition, the image analytics server 900 stores each sampled location of each region by its X, Y coordinates relative to the entire image (together with its color values), and each region is assigned one or more color values based on the color determination. Further, the dominant color processor 930 instructs the image analytics server 900 to search for pattern(s) in the image. The image analytics server 900 can recognize a change in color when a certain parameter changes by more than a fixed threshold, such as 15%. As a result, the image analytics server 900 can built a virtual map which depicts colors in positions to indicate where color changes occur and, in aggregate, a pattern can emerge. By identifying each region's color and the location of each region relative to the entire image, the image analytics server 900 can determine patterns, for example, using pixel geometry techniques that are known in the art. Once the patterns and colors are determined, the image analytics processor 900 assigns identifying numerical values.

Once the color data for the color swatch, in accordance with an exemplary embodiment of the claimed invention, the image analytics server 900 associates or maps the color swatch to one of the 4096 universal hexadecimal codes based on Euclidian distance between the determined color of the image and the claimed universal color system. The determined value of the image is compared to all of the values of the universal color system to reverse map the color (e.g., the merchant's product color). Preferably, the image analytics processor 500 compares the determined value to each of the 4096 hexadecimal colors/values/codes of the claimed universal color system and determines the Euclidian distance between the determined value of the image and each hexadecimal code. The matched color processor 900 of the color system database server 950 assigns the image the hexadecimal code yielding the lowest Euclidean distance and associates the hexadecimal value and the corresponding Euclidean distance with the image in the data warehouse 200.

Where the determined color from the image analysis 560 is not precisely the same as one of the universal colors (i.e., one of the 4096 colors) in the core color database 570, the matched color processor 960 selects a candidate color that is the closest one of the available colors in the core color database 570. In accordance with an exemplary embodiment of the claimed invention, the matched color processor 960 determines the candidate color by using the following formula $c=\text{sqrt}((r-r_1)^2(g-g_1)^2+(b-b_1)^2)$, wherein c=closest color; r=first red value; $r_1$=second red value; g=first green value; $g_1$=second green value; and b=first blue value $b_1$=second blue value. Using component RGB values for the candidate colors and known color from the processed image, the closest candidate color to the known color present in the processed product image is the color that yields a value where c is closest to 0. (A value of c=0 means that the colors are the same.)

Once a candidate color is selected as a result of the image analysis 560, the image analytics server 900 generates a record in a color-pattern table 580 at step 1070 which utilizes a unique item or product ID of the product listed in the item table 540 to link a given product provided by the IMS/SCM feed 510 to the hexadecimal code of the candidate color in the color pattern-table 580. That is, the image analytics server 900 syncs the normalized and converted color data of the IMS/SCM data feeds 510 into the universal hexadecimal color codes, thereby establishing a universal color code or identifier for each product that was input into the server 100 from the merchants' IMS/SCM systems 500. This advantageously enables the claim system to normalize, codify, search and dynamically analyze products from a plurality of merchants by color rather than by text. That is, the claimed invention reverse maps various merchant color systems into one universal color system.

In accordance with an exemplary embodiment of the claimed invention, the image analytics server 900 reverse maps the current and non-uniform color conventions and identifications of merchants without fundamentally damaging or totally eliminating those merchants' own color-naming preferences. The matched color processor 960 converts the RGB value to the closest matching hexadecimal value within the universal color system to reverse map the merchant's product colors to the universal hexadecimal codes of the claimed invention. In accordance with an exemplary embodiment of the claimed invention, the image analytics processor 550 converts using a proximity numerical search to locate a single color in the universal color system that most closely matches the three RGB values of the image. In addition to the claimed color classification of identifying colors by hexadecimal or RGB codes, e.g., hexadecimal code FF0066 corresponding to the RGB code (255 Red, 0 Green, 102 Blue), the color may also be identified in the data warehouse 200 and/or merchant database using the merchant's unique color name or alias, e.g., "flamingo pink." Likewise, other merchants that wish to assign their own alias to that very same color may do so using a different name. Regardless of the number of aliases applied to the particular color, the key is that all are codified and searchable using the standardized hexadecimal and/or RGB values assigned to the color.

By reverse mapping all major merchant color systems into a single universal color system, a significant hindrance to user searching for and finding products from different merchants is resolved. Reverse mapping enables dynamic analysis and codification of precise color. When layered into proprietary merchant IMS/SCM systems, the search is further enhanced as it is no longer requires scraping the Internet. Likewise, issues associated with merchant product planning and production is ameliorated by providing them with standardized color information on sales, searches and availability.

Each data set introduced in the data warehouse 200 represents interrelated data sets that communicate with and rely on other data sets for complete information (but do not necessarily represent discrete data sets). These data sets may be accessed using a variety of database management systems (DBMS), including but not limited to relational database management systems (RDBMS) and "post-relational" database management systems (e.g., not only Structured Query Language ("NOSQL") database management systems). In this manner, the data sets illustrated in FIG. 1, namely, user data 202, merchant data 204, product data 206 and color data 208, are meant to be purely illustrative and are not intended to necessarily depict a physical housing of data. Furthermore, by using a DBMS such as RDBMS or a "post-relational" DBMS, the data may be available to a merchant in a variety of manners, such as based on a specific demographic profile or a specific color or color grouping.

In accordance with an exemplary embodiment of the claimed invention, color data 208 comprises data specifics for color information, including but not limited to: hexadecimal color identification information; RGB color identification information; pattern identification information; statistical color information; keyword information; and color grouping information. The hexadecimal color identification information is stored as color data 208 in the form of hexadecimal codes for each selectable color. The RGB color identification information is stored as color data 208 in the form of RGB component intensities for each selectable color. Preferably, each RGB component intensity maps to a corresponding hexadecimal code. The pattern identification information is stored as color data 208 in the form of pre-determined pattern configurations.

The statistical color information stored as color data 208 provides information relating to popularity or frequency of the product's color, e.g., frequency of men shirts containing a particular color. It can also provide trending information as to which product colors were popular in the current season and which product colors are forecasted to be popular in the next season based consumer purchases. This can be valuable to manufacturers and retailers in determining what product colors to manufacture and stock in their stores.

The keyword information stored as color data 208 can be frequently user-associated keywords relating to a particular color. The associated keywords may be based on an original color-word association index; user-defined keywords whereby a user associates colors with specific keywords; and pre-determined keywords which the user links with colors that the user determines are associated with those pre-determined keywords. The server 100 stores and updates keywords and their color associations as users continue to update and create associations in the data warehouse 200. Color grouping information stored as color data 208 can be colors associated with a timeless collection or a particular trending collection (e.g., Spring 2012 colors).

It should be appreciated that data stored as color data 208 can be indexed and cross-referenced in a number of useful ways by associating color data 208 with specific types of user data 202, merchant data 204 and product data 206. In this way, data in the data warehouse 200 is interrelated forming a powerful tool in the context of predictive analytics.

Following the consumption of normalized data from SCM and ISM feeds 510 and color assignment utilizing universal hexadecimal color identifiers, a number of merchant tools are enabled which pertain to predictive analytics 610, a B2C platform which includes a digital personal shopper application 620, advertising to consumers 630 and other applications 640. Notably, these tools leverage the ability of the system to capture codified color data from a plurality of customized proprietary IMS and SCM systems 500 previously available in the prior art.

Upon following an acceptable format and input of information, SCM data feeds 510 are transmitted and loaded onto server 100 by the merchant's SCM system 500 as soon as the product goes into production. As products are manufactured and are ready to enter inventory, the databases in a merchant's IMS and SCM systems 500 are updated to reflect available inventory of product, resulting in additional data being sent from the IMS/SCM systems 500 to server 100. In accordance with an exemplary embodiment of the claimed invention, once products enter merchant inventory, events are triggered to issue and release targeted advertisements, digital catalogues and other marketing tools to connect now-available products with consumer users. Where there are delays in production of product of a certain color, the IMS/SCM feeds 510 are likewise updated, which may trigger other advertising events. As available products are sold, IMS/SCM systems 500 continue to be updated, with corresponding data being sent to server 100. While the example herein references information initially input and fed to server 100 via the supply chain, it should be appreciated that information may be fed to server 100 utilizing inventory management information that typically relates to the post-production status of product.

By integrating a universal color identification technique into proprietary IMS/SCM systems, available color data can be dynamically analyzed and integrated to enable merchants to make color-based decisions and recommendations on a real-time basis that were heretofore not practical or, at best, based on incomplete information. With respect to supply chain management, inventories of products by particular colors can be managed and prioritized and decisions to replenish inventories can be effected sooner by triggering manufacturing and distribution as soon as, for example, certain sales thresholds are met, inventories dip below a particular level and/or additional consumer need is identified beyond current supply plans and capabilities. Moreover, merchants can also advertise and give information users on expected availability using available supply chain management information. Similarly, such information can be used to allow users to pre-order products. On the inventory side, inventories of available products can be kept more stable by promoting products based on current and near-term availability. Furthermore, where a particular color for a product is unavailable, default settings enable recommendations to be made of the closest matching color. Thus, product search and recommendations can be made considering both current and future inventories.

In the examples presented above, colors are determined and classified in 6-digit hexadecimal values. However, it should be understood that the available colors for classification can be adjusted to correspond to an expandable or fixed color environment. For example, in an expandable environment of colors, a color in a given image is assigned a 6-digit hexadecimal value (and corresponding RGB values) that corresponds to one of the 4,096 selectable values but can expand to include additional colors as needed. The assignment of the 6-digit hexadecimal value (and corresponding RGB values) enables expansion if additional colors are desired beyond 4,096 through the 16+ million colors that are actually available. It should be appreciated that each hexadecimal code can be converted into component RGB values and/or a binary representation.

In a fixed environment of 4,096 colors, each of the component RGB colors presented on a scale of 0 to 255 can be adjusted downward to 16 intensities of RGB, respectively, on a scale of 0-15. Based on the 16 color intensities of each of these colors, a total of $16^3$ or 4096 colors variations are possible. For example, the color identified in hexadecimal code as CB93B1 and corresponding RGB values: 203 Red: 147 Green: 177 Blue could be adjusted on a 4096 color scale to hexadecimal code C9B and corresponding RGB values: 13 Red: 9 Green: 11 Blue, by using the closest values on the 16-level RGB scale. On this form of scale, these values would be associated with a product, such as a shirt, to which the image or color swatch belongs such that when a query for color C9B is made, one of the recommendations and or product results is the shirt. While utilizing only 16 RGB intensities (and 3 hexadecimal digits) does not easily lend itself to color expansion, it still permits a fair level of color variance sufficient for consumer and merchant classification.

Figure 9:
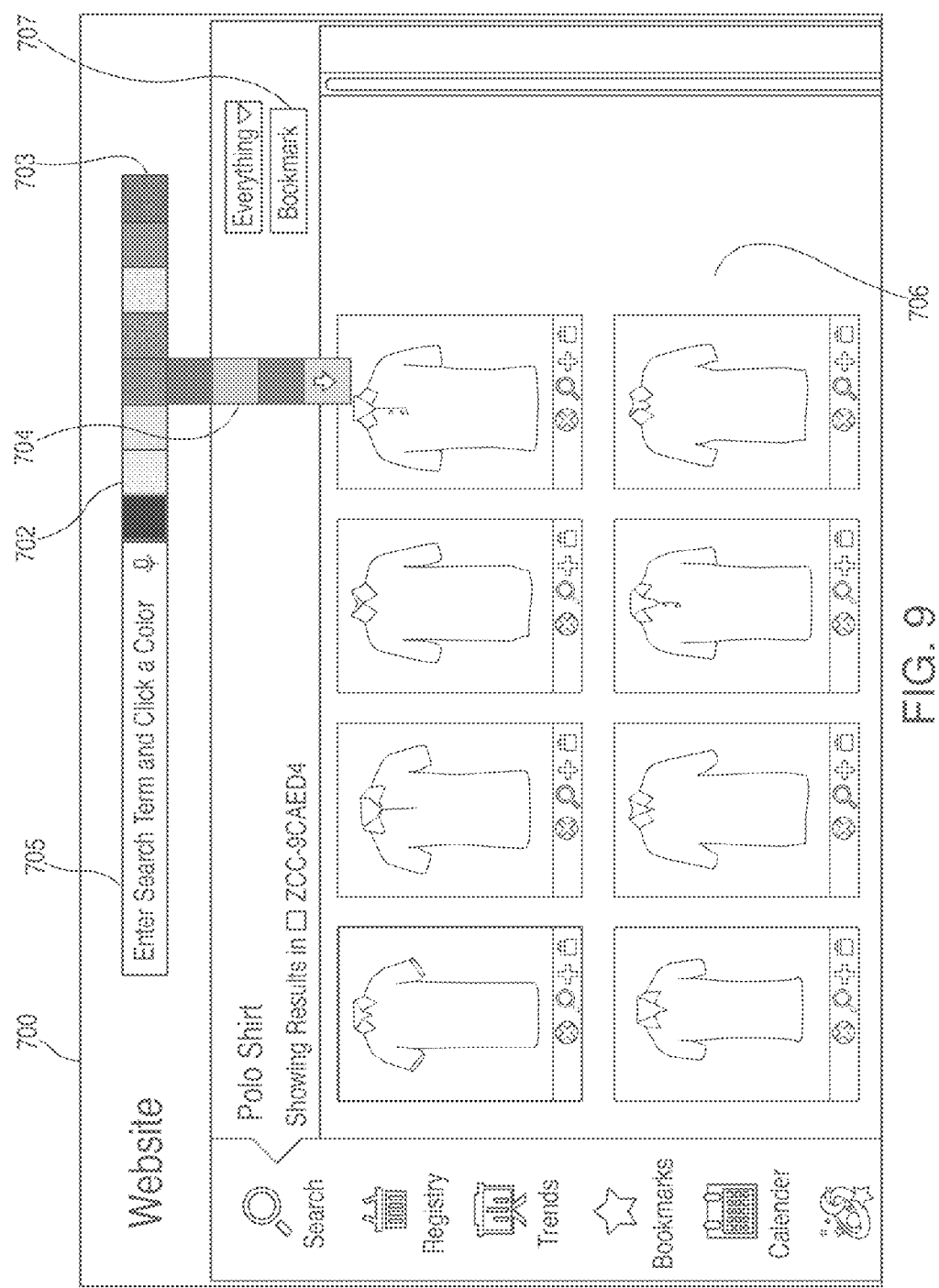
FIG. 9 illustrates an exemplary graphical user interface or display for color search access in accordance with an exemplary embodiment of the claimed invention.

Turning now to FIGS. 3 and 9, all user subscribers gain entry and access to a graphical user interface 700 by subscription and by using known security approaches, such as a login and password 710, which are optionally managed by a separate login server (not shown). Once a login 710 is confirmed and a subscriber authenticates, a user's age, gender, location and other demographic information is loaded 720 and the verified user is permitted access to the search query functions 730.

In accordance with an exemplary embodiment of the claimed invention, a color-based search query is initiated via graphical user interface 700. By selecting a selectable color area or swatch 702 along the top of the interface, a user may initiate a search for products from item table 540 (and color pattern table 580) with the associated digital color codes (e.g., in hexadecimal, RGB, binary) that correspond to the selectable color area 702. It should be appreciated that the query/ies sent to item table 540 and to color pattern table 580 may be referred to as a single query for ease of reference since the query received by each table requests essentially the same information. As illustrated in FIG. 9, when a user desires to search for products of a particular color, the user selects a color from one of the selectable color bar colors that appear on the clickable horizontal color bar 703. Once one of the colors on the horizontal bar 703 is selected, a vertical bar 704 expands downward, typically with shades of the initial color selected on the horizontal color bar 703. Once a user makes a final selection a search query is transmitted to the item table 540.

Preferences in the color swatches 702 appearing on the color bars 703, 704 may also be controlled and modified via the user interface 700, typically utilizing the bookmark feature 707. In controlling changes to selectable colors that readily appear on the GUI 700, a user may also be presented with a modify color panel (not shown).

When inputting additional search parameters in the textual search field 705, such as "Polo Shirt," results coincide with products from item table 540 (and color pattern table 580) that meet both search limitations: 1. "Polo Shirt" and 2. The designated color code, in this case, the hexadecimal color identifier 9CAED4. Search results 740 are returned by the database engine and rendered in a designated display area 706. When resources permit, queries are performed continuously and automatically for products with identifying colors that match those colors that appear as selectable color areas 702 on a user's GUI 700. This enables population of the designated display area 706 with some relevant products from item table 540 before a user initiates a formal search.

Ideally, matches that are made comprise products from the item table 540 with associated colors that are identical (e.g., same hexadecimal values) to the color that is selected on the color bar. However, it may also be desirable under certain circumstances to return products with matching colors which are not identical, but which have a color code identification that is nearly the same or the one closest to the queried color. As noted above, in determining the closest matching color to the queried color, the color search processor of the server 100 executes the following calculation $c = \text{sqrt}((r-r_1)^2 \ (g-g_1)^2 + (b-b_1)^2)$, wherein c=closest color; r=first red value; $r_1$=second red value; g=first green value; $g_1$=second green value; and b=first blue value $b_1$=second blue value. The candidate matching color is the one or more colors that yield the value closest to zero.

Furthermore, it should be appreciated that advanced search queries may be performed by a user via the GUI 700, inputting a variety of parameters to narrow search results and, ideally, to find specific types of products that are available for purchase. These parameters may include a second color-based identifier, a specific pattern, or a physical attribute, such as size.

While the embodiments illustrated herein enable a user to search for a plurality of desired colors in one item (e.g., a first color and a secondary color), as well as specific pattern-color combinations (e.g., blue and red plaid), it should be appreciated that the system and storage may be configured to enable a user to search for "complementary" colored items to a queried color. To that end, in addition to the hexadecimal codes and RGB codes and other information associated with a particular color, a listing comprising one or more complimentary colors may be associated with each selectable color. Rules for determining what colors constitute a complimentary color may be incorporated such that queries return applicable results when the complementary color search is desired. For example, since a given shade of blue is known to complement or "go with" all other shades of blue along with a small sample of shades of red, the item table 540 and core color database 570 may list lists the complimentary shades of blue and red accordingly. Based on the rules, complimentary colors may be found in predetermined ranges, thereby allowing for multiple shades of a particular color to be categorized the same with respect to being identified as a complimentary color.

In addition to receiving results 740, in accordance with an exemplary embodiment of the claimed invention, the system further provides a user with a number of user actions or options 800 to share the product via a social medium 810 (and to a social database 812), to "like" the product 820, to save the product as a bookmark 830 or into a user registry, to "hide" the product to ensure that it never appears again in a user's search results 840, and to purchase the product 850. When selections are made, they are stored as records in a user history table 860 and conveyed to the real-time analytics processor of the server 100 to analyze and utilize for future recommendations to the user and to others with correlating selections and/or demographics. Thus, information from searches performed by users of available products or merchant inventory is organized and indexed as user data and is used to formulate user preferences that is available to be used for future recommendations to the users providing the data, as well as to other users sharing common user demographics and/or online shopping activities.

The accompanying description and drawings only illustrate several embodiments of a system, methods and interfaces for color-based identification, searching and matching, however, other forms and embodiments are possible. Accordingly, the description and drawings are not intended to be limiting in that regard. Thus, although the description above and accompanying drawings contain much specificity, the details provided should not be construed as limiting the scope of the embodiments but merely as providing illustrations of some of the presently preferred embodiments. The drawings and the description are not to be taken as restrictive on the scope of the embodiments and are understood as broad and general teachings in accordance with the present invention. While the present embodiments of the invention have been described using specific terms, such description is for present illustrative purposes only, and it is to be understood that modifications and variations to such embodiments may be practiced by those of ordinary skill in the art without departing from the spirit and scope of the invention.

The invention claimed is:

1. A computer based method for normalizing and codifying divergent color systems into a universal color system, comprising the steps of:

receiving data feeds comprising a plurality of color swatches or images from a plurality of merchant systems by a middleware engine of a server over a communications network;

normalizing the data feeds into a common format by the middleware engine;

extracting image data comprising a plurality of product images from the normalized data feeds;

segmenting each product image into a plurality of segments by an image segmentation processor;

analyzing each segment to determine a dominant color for said each segment by a dominant color processor;

determining at least one dominant product color for said each product image based on prevalence of said at least one dominant product color in said each segment by the dominant color processor;

converting said at least one dominant product color to a digital hexadecimal value based on color component intensity values by a matched color processor;

assigning a hexadecimal code of the universal color system to said each product image that is closest to the digital hexadecimal value of said each product image by the matched color processor; and storing the data feeds, said each product image, said each segment of said each product image, the dominant color for said each segment, said at least one dominant product color for said each product image, the digital hexadecimal value and the hexadecimal code of said each product image in a database by the server.

2. The method of claim 1, further comprising the steps of determining an Euclidian distance between the digital hexadecimal value and each hexadecimal code of the universal color system based on their color component intensity values; and assigning the hexadecimal code yielding a shortest Euclidian distance to said each product image by the matched color processor.

3. The method of claim 1, further comprising the steps of receiving the data feeds from a plurality of merchant inventory management systems and a plurality of merchant supply chain management systems by the middleware engine over said communications network, and generating a product database from the data feeds received from said plurality of merchant inventory management systems and said plurality of merchant supply chain management systems indexed and searchable by color based queries.

4. The method of claim 3, wherein the step of normalizing comprises the step of depersonalizing the data feeds received from said plurality of merchant inventory management systems and a said plurality of merchant supply chain management systems to remove merchant or consumer identifying information by the middleware engine.

5. The method of claim 1, further comprising the step of dividing said each segment until only one dominant color is identified in a subdivision by the image segmentation processor.

6. The method of claim 1, further comprising the steps of determining the dominant color of said each segment on a pixel by pixel basis by the dominant color processor, the color appearing most frequently across all pixels being designated as the dominant color of said each segment; generating a color histogram of dominant colors for said each segment; and generating a parseable ordered list of dominant colors for said each segment from the color histogram by the dominant color processor.

7. The method of claim 1, further comprising the steps of extracting a pattern from said each segment, and categorizing the pattern in said each segment by determining proximity and frequency of two or more colors within said each segment by a pattern identification processor.

8. A system for normalizing and codifying divergent color systems into a single universal color system, comprising:
- a server connected to a communications system to receive, process and codify divergent color data from a plurality of merchant systems, the server comprising:
  - a middleware engine to receive data feeds comprising a plurality of color swatches or images from said plurality of merchant systems, and to normalize the data feeds into a common format;
  - an image segmentation processor to extract image data comprising a plurality of product images from the normalized data feeds, and to segment each product image into a plurality of segments;
  - a dominant color processor to analyze each segment to determine a dominant color for said each segment, and to determine at least one dominant product color for said each product image based on prevalence of said at least one dominant product color in said each segment; and
  - a matched color processor to convert said at least one dominant product color to a digital hexadecimal value based on color component intensity values, and to assign a hexadecimal code of the universal color system to said each product image that is closest to the digital hexadecimal value of said each product image; and
  - a database for storing the data feeds, said each product image, said each segment of said each product image, the dominant color for said each segment, said at least one dominant product color for said each product image, the digital hexadecimal value of said each product image.

9. The system of claim 8, wherein the matched color processor determines an Euclidian distance between the digital hexadecimal value and each hexadecimal code of the universal color system based on their color component intensity values, and assigns the hexadecimal code yielding a shortest Euclidian distance to said each product image.

10. The system of claim 8, wherein the middleware engine receives the data feeds from a plurality of merchant inventory management systems and a plurality of merchant supply chain management systems; and wherein the server generates a product database from the data feeds received from said plurality of merchant inventory management systems and said plurality of merchant supply chain management systems indexed and searchable by color based queries.

11. The system of claim 10, wherein the middleware engine depersonalizes the data feeds received from said plurality of merchant inventory management systems and said plurality of merchant supply chain management systems to remove merchant or consumer identifying information.

12. The system of claim 8, wherein the image segmentation processor divides said each segment until only one dominant color is identified in a subdivision.

13. The system of claim 8, wherein the dominant color processor determines the dominant color of said each segment on a pixel by pixel basis, the color appearing most frequently across all pixels being designated as the dominant color of said each segment; generates a color histogram of dominant colors for said each segment; and generates a parseable ordered list of dominant colors for said each segment from the color histogram.

14. The system of claim 8, wherein the server further comprises a pattern identification processor for extracting a pattern from said each segment, and categorizing the pattern in said each segment by determining proximity and frequency of two or more colors within said each segment.

15. A non-transitory computer readable medium comprising computer executable code for normalizing and codifying divergent color systems into a single universal color system, the computer executable code comprising instructions for:
- receiving data feeds comprising a plurality of color swatches or images from a plurality of merchant systems by a middleware engine of a server over a communications network;
- normalizing the data feeds into a common format by the middleware engine;
- extracting image data comprising a plurality of product images from the normalized data feeds;
- segmenting each product image into a plurality of segments by an image segmentation processor;
- analyzing each segment to determine a dominant color for said each segment by a dominant color processor;
- determining at least one dominant product color for said each product image based on prevalence of said at least one dominant product color in said each segment by the dominant color processor;
- converting said at least one dominant product color to a digital hexadecimal value based on color component intensity values by a matched color processor;
- assigning a hexadecimal code of the universal color system to said each product image that is closest to the digital hexadecimal value of said each product image by the matched color processor; and
- storing the data feeds, said each product image, said each segment of said each product image, the dominant color for said each segment, said at least one dominant product color for said each product image, the digital hexadecimal value and the hexadecimal code of said each product image in a database by the server.

16. The non-transitory computer readable medium of claim 15, wherein said computer executable code further comprises instructions for determining an Euclidian distance between the digital hexadecimal value and each hexadecimal code of the universal color system based on their color component intensity values; and assigning the hexadecimal code yielding a shortest Euclidian distance to said each product image by the matched color processor.

17. The non-transitory computer readable medium of claim 15, wherein said computer executable code further comprises instructions for receiving the data feeds from a plurality of merchant inventory management systems and a plurality of merchant supply chain management systems by the middleware engine, and generating a product database from the data feeds received from said plurality of merchant inventory management systems and said plurality of merchant supply chain management systems indexed and searchable by color based queries.

18. The non-transitory computer readable medium of claim 17, wherein said computer executable code further comprises instructions for depersonalizing the data feeds received from the merchant said plurality of merchant inventory management systems and said plurality of merchant supply chain systems to remove merchant or consumer identifying information by the middleware engine.

19. The non-transitory computer readable medium of claim 15, wherein said computer executable code further comprises instructions for dividing said each segment until only one dominant color is identified in a subdivision by the image segmentation processor.

20. The non-transitory computer readable medium of claim 15, wherein said computer executable code further comprises instructions for determining the dominant color of said each segment on a pixel by pixel basis by the dominant color processor, the color appearing most frequently across all pixels being designated as the dominant color of said each segment; generating a color histogram of dominant colors for said each segment; and generating a parseable ordered list of dominant colors for said each segment from the color histogram by the dominant color processor.

21. The non-transitory computer readable medium of claim 15, wherein said computer executable code further comprises instructions for extracting a pattern from said each segment, and categorizing the pattern in said each segment by determining proximity and frequency of two or more colors within said each segment by the pattern identification processor.

* * * * *